United States Patent [19]
Yoshida et al.

[11] Patent Number: 5,794,064
[45] Date of Patent: Aug. 11, 1998

[54] DATA DRIVEN INFORMATION PROCESSOR

[75] Inventors: Shinichi Yoshida; Tsuyoshi Muramatsu, both of Nara, Japan

[73] Assignee: Sharp Kabushiki Kaisha, Osaka, Japan

[21] Appl. No.: 613,671

[22] Filed: Mar. 11, 1996

[30] Foreign Application Priority Data

Mar. 17, 1995 [JP] Japan .................. 7-058843

[51] Int. Cl.$^6$ .................................. G06F 15/82
[52] U.S. Cl. .................. 395/800.25; 395/800.26
[58] Field of Search ............. 395/800.26, 800.25

[56] References Cited

U.S. PATENT DOCUMENTS

| | | | |
|---|---|---|---|
| 4,953,082 | 8/1990 | Nomura | 395/800 |
| 5,021,947 | 6/1991 | Campbell | 395/800.25 |
| 5,452,464 | 9/1995 | Nomura | 395/775 |
| 5,481,747 | 1/1996 | Kametani | 395/800 |
| 5,535,413 | 7/1996 | Ishikawa | 395/800 |
| 5,555,386 | 9/1996 | Nomura | 395/375 |

FOREIGN PATENT DOCUMENTS 4-316918  11/1992  Japan .
5-330086  12/1993  Japan .

*Primary Examiner*—Eric Coleman

[57] ABSTRACT

A data driven processor includes an output processing unit outputting a data packet outside the processor while referencing a branch control parameter register group. In the register group, a processor number/generation number specifying parameter P/G, a branch comparison parameter RM, and a branch comparison data parameter RD are stored. At the time of output of the data packet, the output processing unit reads out any one of a processor number and a generation number in the data packet according to parameter P/G, and sends out the data packet to any one of output ports OA and OB according to the result of predetermined operation processing using the read out number and parameters RM and RD. When a plurality of processors which operate as described above are connected to each other to carry out processing simultaneously while inputting/outputting a data packet, a data path among the processors can be set and changed easily according to any of the processor number and the generation number in the packet.

66 Claims, 23 Drawing Sheets

R4 : A/B STORAGE REGISTER
A/B: PARAMETER FOR SPECIFYING OUTPUT TARGET WHEN BRANCH CONDITION TERMS MATCH

FIG. 9

| ⊢ 8 ⊣ | ⊢ 9 ⊣ | | ⊢ 9 ⊣ | ⊢ 9 ⊣ | ⊢ 9 ⊣ | ⊢ 9 ⊣ |
|---|---|---|---|---|---|---|
| C | Pe# | Don't Care | RMA | RMB | RDA | RDB |

FIG. 11

| ⊢ 8 ⊣ | ⊢ 9 ⊣ | | ⊢1⊣⊢1⊣ | ⊢ 9 ⊣ | ⊢ 9 ⊣ |
|---|---|---|---|---|---|
| C | Pe# | Don't Care | A/B \| P/G | RMA | RDA |

FIG. 13

| |-8-| |-9-| | |-1-|-9-|-9-|-9-|-9-|

| C | Pe# | Don't Care | P/G | RMA | RMB | RDA | RDB |

FIG. 15

| |← 8 →|← 9 →| |←1→|← 9 →|← 9 →|← 9 →|← 9 →|
|---|---|---|---|---|---|---|---|---|
| | C | Pe# | Don't Care | A/B | RMA | RMB | RDA | RDB |

| ⊢ 8 ⊣ | ⊢ 9 ⊣ | ⊢1⊣1⊣ | | ⊢ 9 ⊣ | ⊢ 9 ⊣ | ⊢ 9 ⊣ | ⊢ 9 ⊣ |
|---|---|---|---|---|---|---|---|
| C | Pe# | Don't Care | P/G | A/B | RMA | RMB | RDA | RDB |

DATA DRIVEN INFORMATION PROCESSOR

BACKGROUND OF THE INVENTION

1. Field of the Invention

The present invention relates to data driven information processors, and more particularly, to a data driven information processor capable of easily setting and changing, when a plurality of information processors are connected to carry out processing simultaneously, the connection among the plurality of processors through a data path.

2. Description of the Background Art

A data driven information processor (hereinafter referred to as a "data driven processor") proceeds processing in parallel according to a simple rule of "when all the data needed for an action are available, and resources such as an operation unit required for the action are assigned thereto, the action is carried out."

FIG. 18 is a block configuration diagram of a data driven information processing system for conventional video signal processing. A system configuration similar to that of FIG. 18 is shown in "An Evaluation of Parallel-Processing in the Dynamic Data Driven-Processor" (published in Microcomputer Architecture Symposium sponsored by Information Processing Society of Japan, Nov. 12, 1991).

The system shown in FIG. 18 includes a data driven processor 1 and an image memory unit 11. Image memory unit 11 includes a memory interface 2 and an image memory 3. Data driven processor 1 includes input ports IA, IB, and IV, and further includes output ports OA, OB, and OV.

A video signal to be processed is applied to input ports IA and IB through transmission paths 7 and 8 connected thereto, respectively. Input port IV, to which a transmission path 5 is connected, receives an access result of image memory 3 in image memory unit 11. Output ports OA and OB send out data on a processing result in the system through transmission paths 9 and 10 connected thereto, respectively. Output port OV sends out data for accessing image memory unit 11 through a transmission path 4 connected thereto. Memory interface 2 and image memory 3 are connected via a memory access control line 6. Note that data transmitted through transmission paths 4, 5, and 7 to 10 is in a form of data packet.

FIG. 19 is a field configuration diagram of a data packet which is applied to embodiments according to the conventional system and the present invention. The data packet includes an instruction code C indicating the content of processing in processor 1, a processor number Pe# for specifying uniquely a data driven processor in the system in which the data packet is to be processed, a node number N for specifying uniquely an instruction to be executed on processor 1, a generation number gen# which is an identifier labeled in accordance with an input time series order when it is input to processor 1 through data transmission path 7 or 8 of FIG. 18, used in matching of data in processor 1, and which serves as an address to image memory 3 for memory interface 2, and data D.

Returning to FIG. 18, in processing data, an input packet having generation number gen# assigned in accordance with an input-time order is applied to processor 1 via input port IA or IB in a time series manner. A data flow program for video processing is prestored in processor 1. Processor 1 processes the content of the applied data packet based on the program, and sends out a data packet storing the processing result via any one of output ports OA and OB. The data packet sent out to image memory unit 11 via output port OV of processor 1 stores an access request for image memory 3 (request for reference/update or the like of data stored in image memory 3). Upon reception of the access request, memory interface 2 accesses image memory 3 through memory access control line 6. After that, memory interface 2 applies a data packet storing the result data to input port IV of processor 1 through transmission path 5. Processor 1 receives the data packet applied via input port IV, and continues the processing based on the program.

FIG. 20 is a block configuration diagram of conventional video processing data driven processor 1. Referring to FIG. 20, processor 1 includes an input processing unit 17 to input stage of which input ports IA and IB are connected, a junction unit 12, a main processing unit 13 for carrying out processing based on a prestored data flow program, a branch unit 14, an output processing unit 15 to output stage of which output ports OA and OB are connected, for carrying out output operation according to the content of a branch control parameter register group 18, and a PE# register 16 for storing a processor identification number PE# for identifying uniquely processor 1 including itself in a networking system. Register group 18 includes an RM storage register R2 for storing a branch comparison mask parameter RM, and an RD storage register R3 for storing a branch comparison data parameter RD.

Input processing unit 17 receives a data packet applied via input ports IA and IB, and compares processor number Pe# in the applied packet and processor identification number PE# in PE# register 16. If they match, input processing unit 17 determines the applied data packet as a data packet addressed to processor 1, and sends out the data packet to junction unit 12. If they do not match, input processing unit 17 determines the applied data packet as a data packet addressed to the other processors, and sends out the data packet to output processing unit 15.

Junction unit 12 receives the applied data packet to send out the same to main processing unit 13.

Main processing unit 13 receives the applied data packet, and processes the data packet according to the prestored data flow program. If access processing to image memory 3 occurs, main processing unit 13 sends out the data packet to image memory unit 11 via output port OV, and after image memory 3 is accessed using the data packet, main processing unit 13 receives the data packet via input port IV.

Branch unit 14 receives the data packet output from main processing unit 13. Branch unit 14 compares processor number Pe# of the applied data packet and identification number PE# of PE# register 16, similarly to input processing unit 17. If they match, branch unit 14 applies the applied data packet to junction unit 12, and if they do not match, branch unit 14 applies the applied data packet to output processing unit 15.

Output processing unit 15 receives the applied data packet, and references processor number Pe# or generation number gen# in the applied data packet. According to the branch condition set in advance by parameters RM and RD in branch control parameter register group 18, output processing unit 15 sends out the applied data packet to any one of output ports OA and OB.

In a data flow processor disclosed in Japanese Patent Laying-Open No. 6-162228, three kinds of parameters are prepared as a branch control parameter: an ID parameter, a branch comparison data parameter, and a branch comparison mask parameter. The ID parameter is equivalent to the content of PE# register 16 of FIG. 20, and the branch comparison data parameter and the branch comparison mask parameter are equivalent to branch comparison data parameter RD and branch comparison mask parameter RM in branch control parameter register group 18. According to the technique disclosed in Japanese Patent Laying-Open No. 6-162228, the branch condition of output processing unit 15 is given by the following expression (1):

$$(RM. \text{ and. } Pe\#). \text{ exor. } (RM. \text{ and } RD) \quad (1)$$

Note that RM and RD in the expression (1) are values stored in branch comparison mask parameter register R2 and branch comparison data parameter register R3, respectively. Pe# in the expression (1) is processor number Pe# in the applied data packet to output processing unit 15. Further, operators "and" and "exor" in the expression (1) indicate a logical product for every bit and an exclusive OR for every bit, respectively.

When the result of the expression (1) is 0, that is, when values of operands (RM. and. Pe#) and (RM. and. RD) for an exor operation match, the applied data packet to output processing unit 15 is output to port OA. When the result of the expression (1) is not 0, that is, when the values of operands (RM. and. Pe#) and (RM. and. RD) for the exor operation do not match, the applied data packet to output processing unit 15 is sent out to port OB.

Further, in Japanese Patent Laying-Open No. 7-191955, an example is shown in which generation number gen# rather than processor number Pe# in the applied data packet to output processing unit 15 is used as a parameter determining the branch condition. According to FIG. 2 of Japanese Patent Laying-Open No. 7-191955, the branch condition is given by the following expression (2):

$$(RM. \text{ and. } gen\#). \text{ exor. } RD \quad (2)$$

Note that RM and RD in the expression (2) are values stored in branch comparison mask parameter register R2 and branch comparison data parameter register R3, respectively. The gen# in the expression (2) is a generation number in the applied data packet to output processing unit 15. Further, operators "and" and "exor" of the expression (2) indicate a logical product for every bit and an exclusive OR for every bit, respectively.

When the result of the expression (2) is 0, the applied packet to output processing unit 15 is send out to port OA. When the result of expression (2) is not 0, the applied packet to output processing unit 15 is sent out to port OB. Although mask processing (a logical product with branch comparison mask parameter RM) is not carried out to branch comparison data parameter RD in the expression (2), there is no substantial difference between the expressions (1) and (2).

FIG. 21 shows a first configuration of a system in which four conventional video processing data driven processors 1 are used. To four processors 1 in the system of FIG. 21, identification numbers PE#0, PE#1, PE#2, and PE#3 for identifying the processors uniquely are assigned, respectively. These identification numbers 0 to 3 are stored in PE# registers 16 in respective processors 1. In the following description, each processor is specified using the identification number assigned to each processor 1.

In the system of FIG. 21, a network is established so that a data packet may be applied from any processor to another arbitrary processor. For example, in order to apply a data packet from processor PE#0 to processor PE#1, a data packet whose processor number Pe# is set to the identification number (1) of processor PE#1 is output from output port OA of processor PE#0. The data packet is once applied to input port IA of processor PE#3. After that, the data packet is output from output port OA of processor PE#3 and applied to input port IA of processor PE#1.

In order to configure such a network, the content of branch control parameter register group 18 of each processor may be set as shown in parameters RM and RD of FIG. 21, for example, based on the above described expression (1). More specifically, under the output branch condition of processor PE#0, if the lowermost bit of processor number Pe# in an output data packet is 1, the data packet is sent out to output port OA, and otherwise to output port OB. Under the output branch condition of processor PE#1, if the lowermost bit of processor number Pe# in the output data packet is 0, the data packet is sent out to output port OA, and otherwise to output port OB. Further, under the output branch conditions of processors PE#2 and PE#3, if processor number Pe# in the output data packet is 0 to 3, the data packet is sent out to output port OA, and otherwise to output port OB.

FIG. 22 shows a first system configuration for carrying out data classification processing using one conventional video processing data driven processor 1. To processor 1 in this system, identification number PE#0 is assigned. A data packet is sequentially applied to input port IA of processor PE#0 in a time series manner, and generation number gen# is applied to each of the input data packets in accordance with an input-time series order.

Consider switching of the output port according to generation number gen# of a data packet applied to input port IA of processor PE#0. When it is desired to set the branch condition so that, when generation number gen# of the input data packet is an even number, the data packet is sent out to output port OA, and that, when generation number gen# of the input data packet is an odd number, the data packet is sent out to output port OB, parameters RM and RD of FIG. 22, for example, may be set in corresponding registers based on the expression (2). According to this setting, under the output branch condition of processor PE#0, the output data packet is sent out to output port OA if the lowermost bit of generation number gen# is 0 (generation number gen# is an even number), and otherwise (generation number gen# is an odd number) to output port OB.

Conventional video processing data driven processors 1 shown in FIGS. 21 and 22 have a similar branch condition setting mechanism. However, they use different reference values in order to determine the branch condition. In the case of FIG. 21 based on the technique disclosed in Japanese Patent Laying-Open No. 6-162228, processor number Pe# in the output data packet is referenced, and in the case of FIG. 22 based on the technique disclosed in Japanese Patent Laying-Open No. 7-191955, generation number gen# in the output data packet is referenced. Therefore, in building up the systems of FIGS. 21 and 22, processors having the respective different branch condition setting mechanisms must be prepared individually, causing cost for development of the processors to increase.

FIG. 23 shows a second configuration of the system in which four conventional video processing data driven processors 1 are used. It is also possible to establish a network configuration in which four processors are connected in series as shown in FIG. 23 using a system having the same physical connection structure as that of FIG. 21. In the case of FIG. 23, although data transmission paths indicated by thin solid lines are physically connected to the respective processors, they are not used as a data transmission path. It is considered that data is set in branch control parameter register group 18 of each processor in this case as shown in parameters RM and RD of FIG. 23, for example. More specifically, under the output branch conditions of processors PE#0, PE#1, and PE#3, the output data packet is sent out to output port OA, and not sent out to output port OB, independent of the values of processor numbers Pe# therein.

On the other hand, in order to send out a data packet to outside the system, the branch condition of processor PE#2 must be so set that the output data packet is sent out to output port OB independent of the value of processor number Pe# therein. However, such setting is impossible when conventional branch control parameter register group 18 is used. Therefore, the branch condition of processor PE#2 is so set that the output data packet is sent out to output port OA only when all the bits of processor number Pe# are 1 (511 when the bit width of processor identification number PE# is nine bits), and otherwise to output port OB.

In such setting of branch control parameter register group 18, if a data packet having processor number Pe# whose bits are all 1 is input to processor PE#2 through input port IA, the data packet is output from output port OA of processor PE#2 to be applied to input port IB of processor PE#0. In the setting of branch control parameter register group 18 shown in FIG. 23, the data packet is again applied to input port IA of processor PE#2 via processors PE#0 →PE#3 →PE#1. Therefore, the data packet circulates permanently in the system of FIG. 23, and the data packet is not output to outside the system.

FIG. 24 shows a second system configuration for carrying out data classification processing using the conventional video processing data driven processor. In the system configuration shown in FIG. 22, a data packet is applied only to input port IA of processor PE#0. However, in FIG. 24, a data packet is also applied to input port IB simultaneously. Referring to FIG. 24, it is desired to set the branch condition with respect to an input data packet from input port IA of processor PE#0 so that, if the lowermost bit of generation number gen# in an output data packet is 0 (generation number gen# is an even number), the data packet is sent out to output port OA, and otherwise (generation number gen# is an odd number) to output port OB similarly to the case of FIG. 22, and to set the branch condition with respect to an input data packet from input port IB so that, if generation number gen# is an even number, the output data packet is sent to output port OA, and that, if generation number gen# is an even number, the output data packet is sent out to output port OB, oppositely from the case of FIG. 22. However, such setting as desired in FIG. 24 is impossible when conventional branch control parameter register group 18 is used, unless generation number gen# in the data packet is manipulated.

FIGS. 25A and 25B each show a data flow graph for carrying out desired data classification processing after generation number conversion using the conventional video processing data driven processor in the system shown in FIG. 24. A data packet input from input port IA is passed through input processing unit 17 and junction unit 12 of FIG. 20, and subjected to generation number conversion processing in main unit processing 13 based on the data flow graphs shown in FIGS. 25A and 25B.

SWGENAND in the flow graphs is an instruction to take a logical product for every bit between generation number gen# in a data packet applied to a corresponding node and a constant value (1 in the example of FIG. 25) to pass the data packet to an output on the left side of the node if the result is 0, and to pass the data packet to an output on the right side of the node if the result is not 0. GENMUL in the flow graphs is an instruction to take a product between generation number gen# in a data packet applied to a corresponding node and a constant value (2 in the example of FIG. 25) to update generation number gen# in the data packet according to the result to pass the data packet to an output of the node. GENADD in the flow graphs is an instruction to take a sum of generation number gen# in a data packet applied to a corresponding node and a constant value (1 in the example of FIG. 25) to update generation number gen# in the data packet according to the result to pass the data packet to an output of the node.

Therefore, as to a data packet applied from input port IA of FIG. 24, generation number gen# is doubled according to the flow graph of FIG. 25A if it is an even number, and generation number gen# is doubled and one is further added to the doubled generation number if it is an odd number. On the other hand, as to a data packet applied from input port IB of processor PE#, generation number gen# is doubled according to the flow graph of FIG. 25B if it is an odd number, and generation number gen# is doubled and one is further added to the doubled generation number if it is an even number.

The data packet subjected to the generation number conversion is passed through branch unit 14 of FIG. 20 to be applied to output processing unit 15. According to the setting content of branch control parameter register group 18 shown in FIG. 24, output processing unit 15 sends out the data packet to output port OA when the lowermost bit of generation number gen# in the data packet after conversion is 0, that is, when generation number gen# is an even number, and to output port OB otherwise, that is, when generation number gen# is an odd number. As a result, although generation number gen# of the output data packet is changed, data classification output desired in FIG. 24 is possible. However, from the standpoint of effective use of the processing ability of a processor, it is not desired to use a processor only for classification of data packets.

SUMMARY OF THE INVENTION

One object of the present invention is to provide a data driven information processor capable of, when a plurality of data driven information processors are connected to each other to carry out processing simultaneously while inputting/outputting data, easily setting and changing a path of data among the processors according to each information item in the data.

Another object of the present invention is to provide a data driven information processor capable of, when a plurality of data driven information processors are connected to each other to carry out processing simultaneously while inputting/outputting data, easily setting and changing a path of data among the processors with the cost of development of the processors suppressed.

Still another object of the present invention is to provide a data driven information processor capable of, when a plurality of data driven information processors are connected to each other to carry out processing simultaneously while inputting/outputting data, easily setting and changing a path of data among the processors without requiring program processing in the processors.

In order to achieve the above described objects, a data driven information processor according to the present invention includes a plurality of output ports, a plurality of input ports each externally supplied with an ordinary data packet including a plurality of different information items and a specific data packet including conditional data for selecting an output port corresponding to the ordinary data packet from the plurality of output ports, an input unit, a processing unit, a storage unit, and an output unit. In operation, when the input unit receives the ordinary data packet or the specific data packet applied to any of the plurality of input ports, the conditional data of the applied specific data packet is stored in the storage unit, and the applied ordinary data packet is processed according to a predetermined procedure in the processing unit for output. The output unit receives the ordinary data packet output from the processing unit, selects any of the plurality of output ports based on the plurality of information items in the received ordinary data packet and the conditional data in the storage unit, and sends out the received ordinary data packet through the selected output port externally.

In particular, since the conditional data includes an information specifying parameter for arbitrarily specifying an information item to be used for the selection out of the plurality of information items in the ordinary data packet, an output port according to an arbitrary information item in the ordinary data packet can be selected in the output unit. As a result, when a plurality of data driven information processors are connected to each other to carry out processing simultaneously, a data path among the processors can be set and changed easily by using the specific data packet.

Conventionally, data driven information processors having different specifications are individually prepared according to information in the ordinary data packet to be referenced at the time of the above described selection. On the other hand, in the data driven information processor according to the present invention, the specific data packet including different information specifying parameters has only to be prepared, whereby the cost of development of the processor can be reduced.

Further, the conditional data includes an output port specifying parameter. As a result, when a plurality of data driven information processors are connected to each other to carry out processing simultaneously, selection of an output port causing the ordinary data packet to circulate among the processors permanently is avoided at the time of the above described selection. Therefore, a consistent data path can easily be set and changed among the processors by using the specific data packet.

The above described selection includes operation processing, and the conditional data includes an operation parameter group for the operation processing for each of the plurality of input ports. An output port is selected in the output unit based on a result of the operation processing using an operation parameter group corresponding to input port information specifying a corresponding input port added to the ordinary data packet. Therefore, an output port according to the input port of the ordinary data packet can be selected, whereby such a system as to connect a plurality of data driven information processors to each other to carry out processing simultaneously is designed easily.

Further, the above described selection of an output port using the conditional data does not require processing in the processing unit. Therefore, when a plurality of data driven information processors are connected to carry out processing simultaneously, a data path among the processors can be set and changed easily while maintaining the processing efficiency according to a predetermined procedure on the ordinary data packet in the processing unit of each processor.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 9 is a field configuration diagram of an initialization packet applied to a branch control parameter register group 48 of FIG. 6.

FIG. 11 is a field configuration diagram of an initialization packet applied to a branch control parameter register group 58 of FIG. 10.

FIG. 13 is a field configuration diagram of an initialization packet applied to a branch control parameter register group 68 of FIG. 12.

FIG. 15 is a field configuration diagram of an initialization packet applied to a branch control parameter register group 78 of FIG. 14.

DESCRIPTION OF THE PREFERRED EMBODIMENTS

Embodiments of the present invention will be described in detail hereinafter with reference to the drawings.

Figure 1:
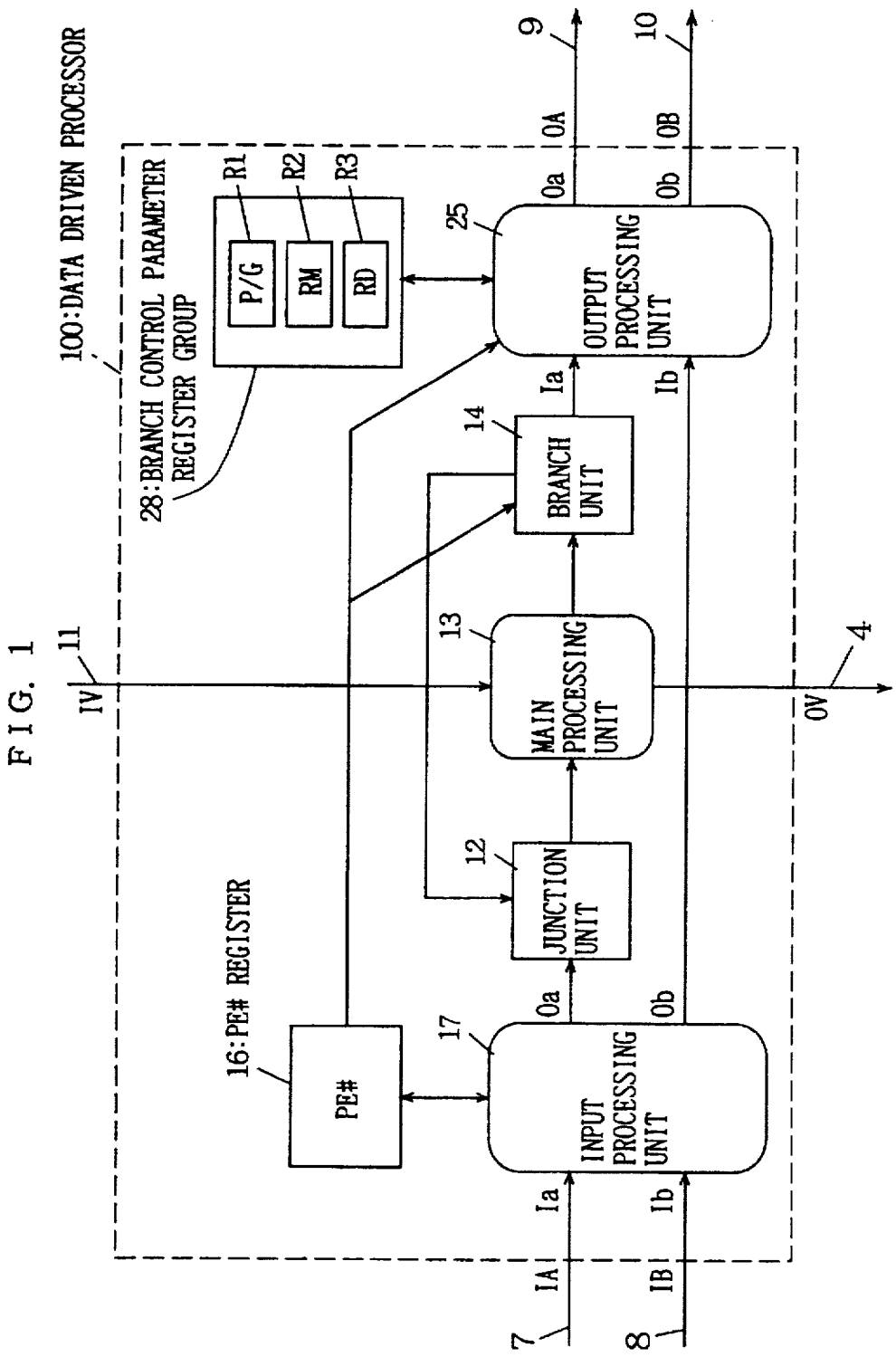
FIG. 1 is a block configuration diagram of a data driven processor according to a first embodiment of the present invention.
Figure 20:
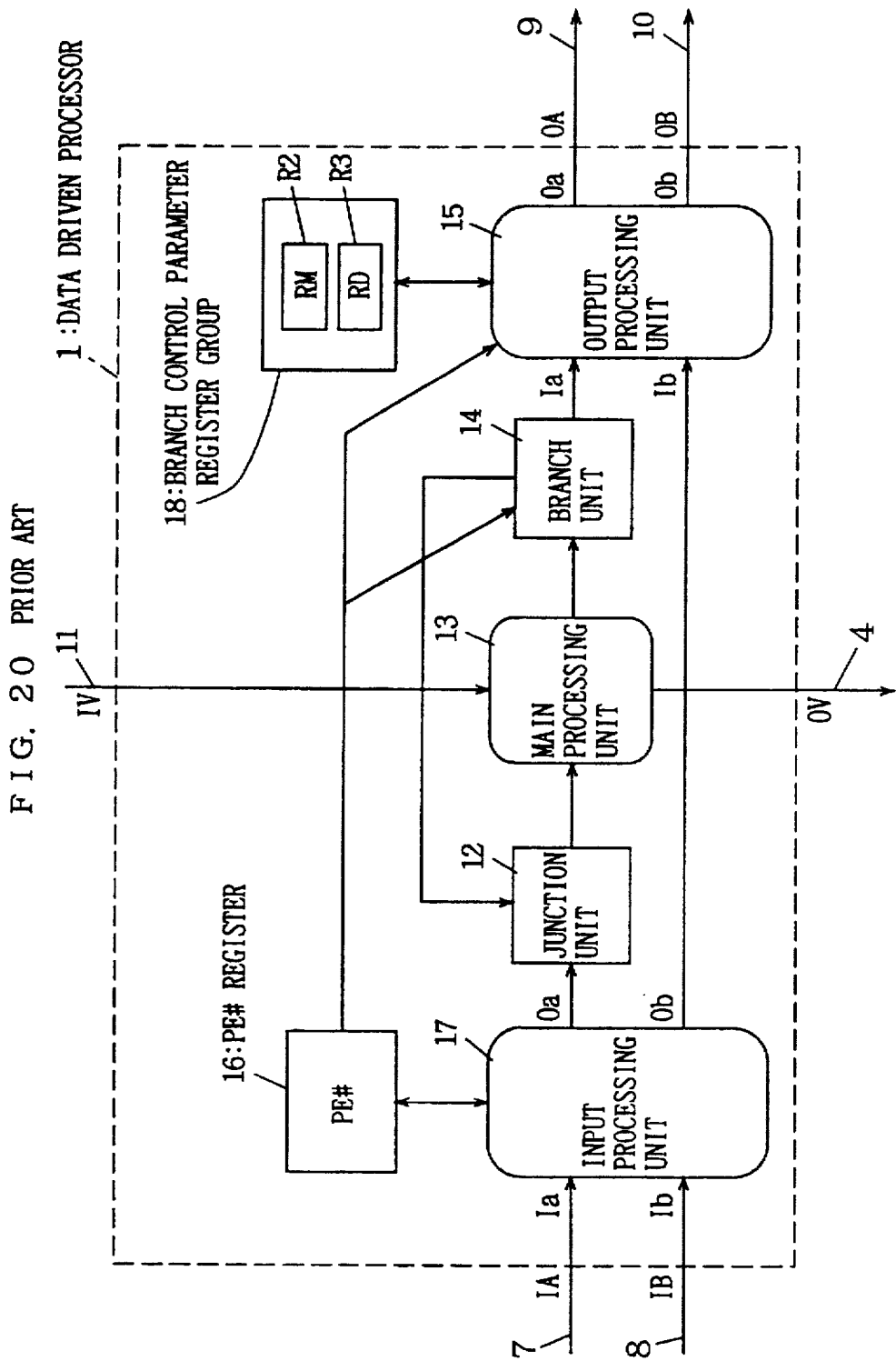
FIG. 20 is a block configuration diagram of a conventional video processing data driven processor.
Figure 21:
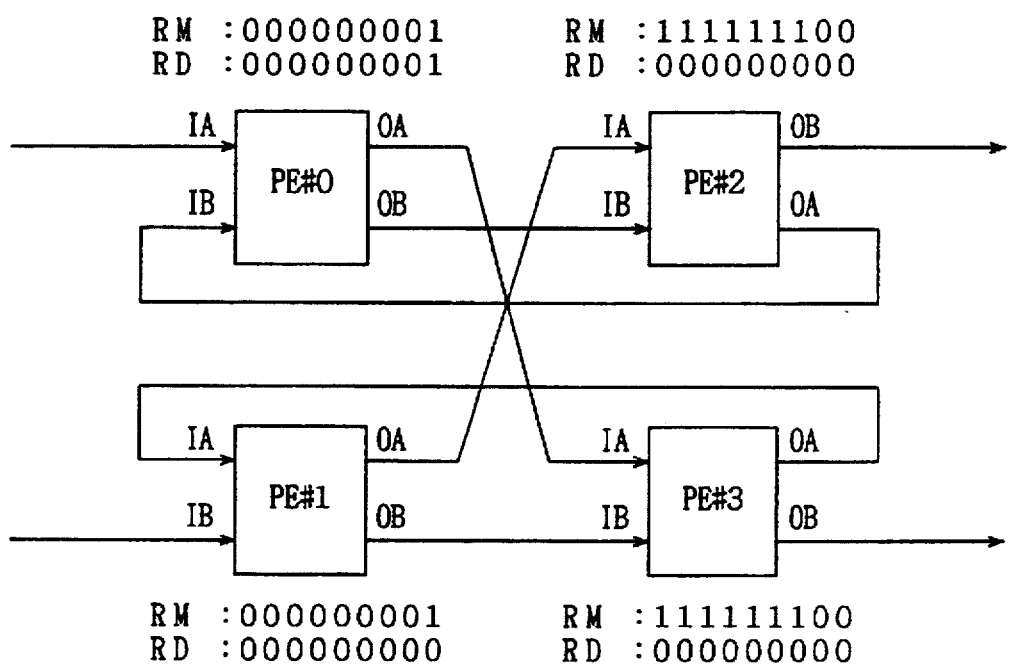
FIG. 21 is a diagram showing a first configuration of a system using four conventional video processing data driven processors.
Figure 22:
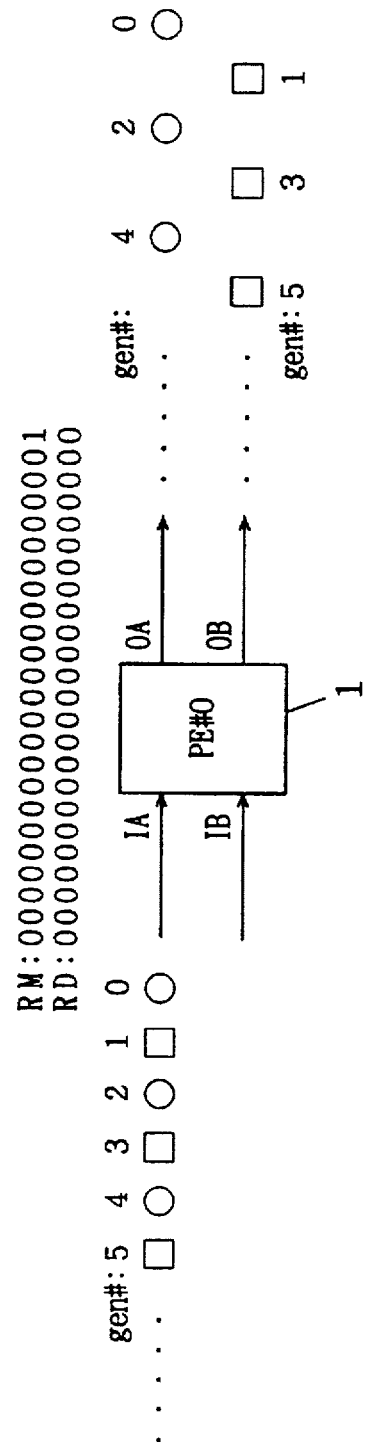
FIG. 22 is a configuration diagram of a first system for carrying out data classification processing using one conventional video processing data driven processor.

Referring to FIG. 1, a data driven processor 100 according to the first embodiment is different from the conventional processor 1 shown in FIG. 20 in that processor 100 of FIG. 1 includes an output processing unit 25 referencing branch control parameter register group 28 instead of output processing unit 15 referencing branch control parameter register group 18 of processor 1 of FIG. 20. Since processor 100 of FIG. 1 is similar to processor 1 of FIG. 20 in the other points, operation of output processing unit 25 referencing branch control parameter register group 28 will be described here.

Branch control parameter register group 28 includes, in addition to conventional RM storage register R2 and RD storage register R3, a P/G register R1 for storing a processor number/generation number specifying parameter P/G for directly specifying information to be referenced in a data packet. When parameter P/G is 1, output processing unit 25 references processor number Pe# in an output data packet to determine the branch condition based on parameters RM and RD using the expression (1). When parameter P/G is 0, output processing unit 25 references generation number gen# in the output data packet to determine the branch condition based on parameters RM and RD using the expression (1).

Figure 19:
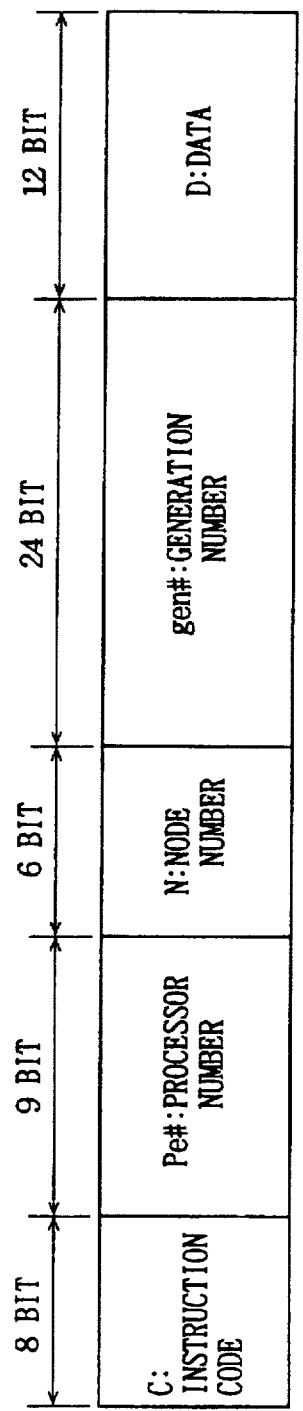
FIG. 19 is a field configuration diagram of an input/output data packet applied to embodiments of the present invention and a conventional example.

According to the field configuration of a data packet shown in FIG. 19, processor number Pe# has a nine-bit width, and generation number gen# has a 24-bit width. However, registers R2 and R3 do not necessarily have a 24-bit width. An appropriate bit width may be set, taking the cost of development of the processor into consideration. If the bit width of each of registers R2 and R3 is nine bits, a method can be employed in which the lowermost nine bits of a field of generation number gen# in a data packet are referenced in determining the branch condition.

As another embodiment of the data driven processor of FIG. 1, information on the bit position of an output data packet from which the content is referenced may be stored in branch control parameter register group 28 instead of parameter P/G. For example, if it is intended to reference processor number Pe# in a data packet, a numerical value of 42 (referring to FIG. 19, the lowermost bit of processor number Pe# corresponds to the 42nd bit of the data packet) is stored in branch control parameter register group 28, and output processing unit 25 references the 42nd and upper bits in the output data packet to determine the branch condition. Similarly, if it is intended to reference generation number gen#, a numerical value of 12 (referring to FIG. 19, the lowermost bit of generation number gen# corresponds to the twelfth bit of the data packet) may be stored in branch control parameter register group 28. In this configuration, not only processor number Pe# and generation number gen#, but also the content of an arbitrary data field in the output data packet can be referenced at the time of determination of the branch condition.

Figure 2:
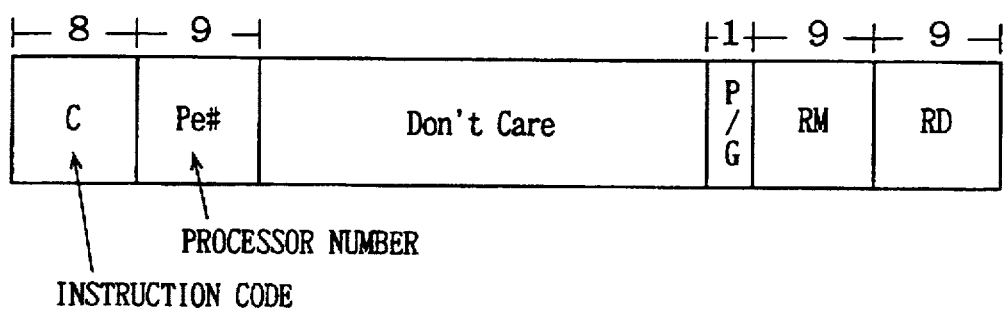
FIG. 2 is a field configuration diagram of an initialization packet applied to a branch control parameter register group 28 of FIG. 1.

Referring to FIG. 2, the initialization packet includes instruction code C, processor number Pe#, processor number/generation number specifying parameter P/G, and parameters RM and RD. Prior to initialization using this packet, assume that the content of each register in register group 28 is set to 0. First, to processor 100, the initialization packet addressed to the same is applied. After the content of the input packet is set in each corresponding register of register group 28, the input packet is erased. After that, if the packet is again input, the content of each register is again set (overwritten). Therefore, by using the initialization packet, the branch condition on packet output of processor 100 can be set and changed arbitrarily. Further, since the initialization packet is erased after data setting by the initialization packet, the amount of data transmission of a transmission path can be kept properly.

Figure 3:
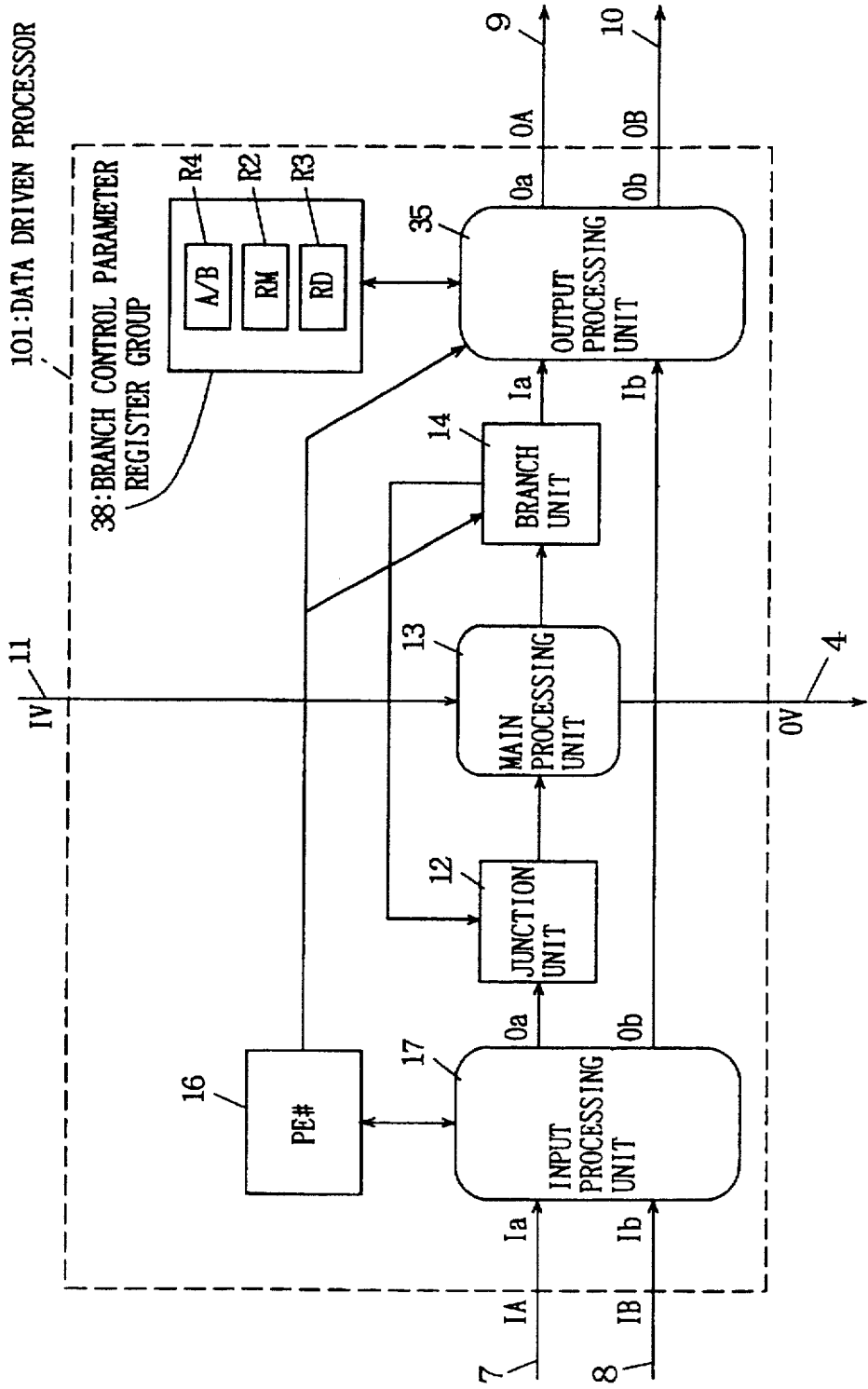
FIG. 3 is a block configuration diagram of a data driven processor according to a second embodiment of the present invention.

Referring to FIG. 3, a data driven processor 101 according to the second embodiment is different from processor 100 of FIG. 1 in that processor 101 includes an output processing unit 35 referencing branch control parameter register group 38 instead of output processing unit 25 referencing branch control parameter register group 28 of processor 100 of FIG. 1. Since processor 101 is similar to processor 100 of FIG. 1 in the other points, operation of output processing unit 35 referencing branch control parameter register group 38 will be described here.

Branch control parameter register group 38 includes, in addition to RM storage register R2 and RD storage register R3, an A/B storage register R4 for storing an output target specifying parameter A/B for specifying to which output port between output ports A and B a packet should be output, when the branch condition terms in the expression (1) match in output processing unit 35, that is, when the result of the expression (1) is 0.

As to the case where parameter A/B is 1, when the result of the expression (1) using processor number Pe# of an output data packet is 0, output processing unit 35 sends out the output data packet to output port OA, and when the result of the expression (1) is not 0, output processing unit 35 sends out the output data packet to output port OB.

In the case where parameter A/B is 0, when the result of the expression (1) using processor number Pe# of an output data packet is 0, output processing unit 35 sends out the output data packet to output port OB, and when the result of the expression (1) is not 0, output processing unit 35 sends out the output data packet to output port OA.

Figures 4, 5:
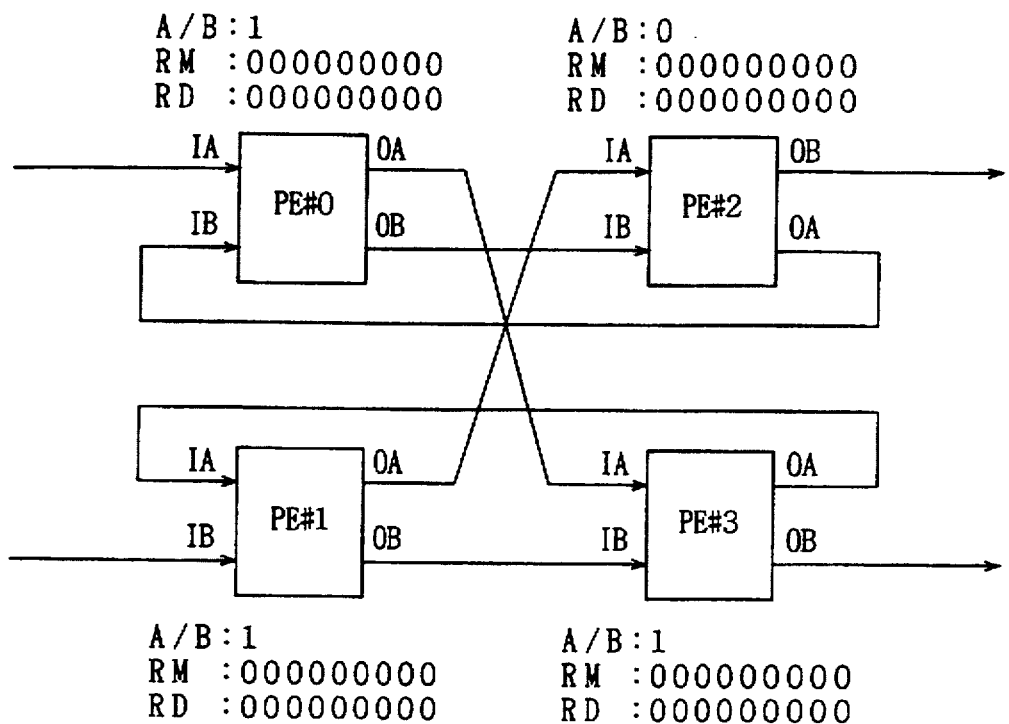
FIG. 4 is a system configuration diagram obtained by re-building a conventional system configuration shown in FIG. 23 using the data driven processor of FIG. 3.
FIG. 5 is a field configuration diagram of an initialization packet applied to a branch control parameter register group 38 of FIG. 3.
Figure 23:
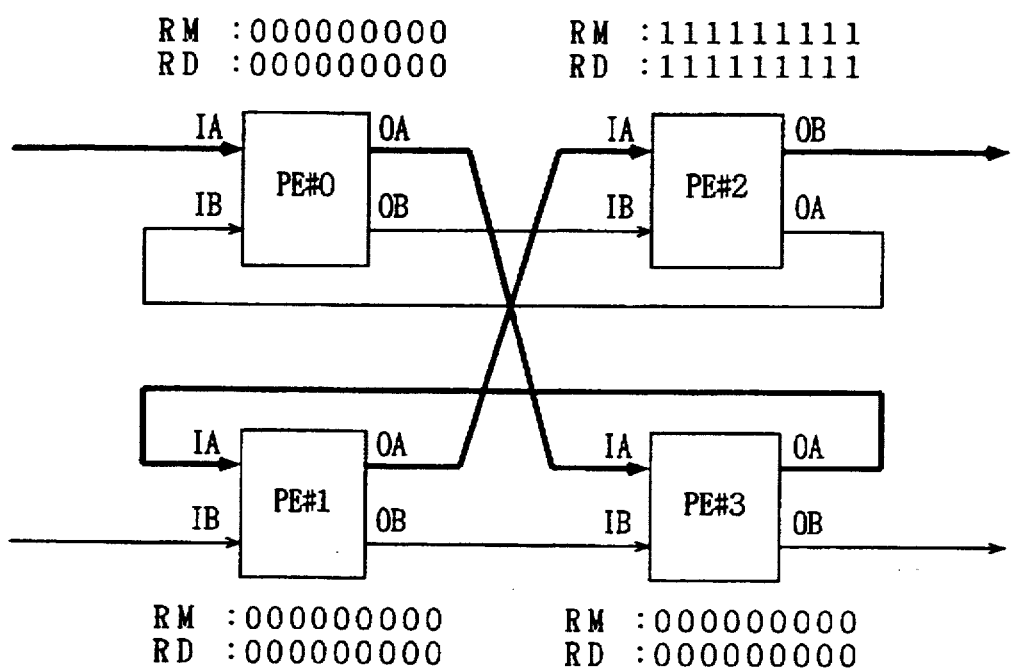
FIG. 23 is a diagram showing a second configuration of the system using four conventional video processing data driven processors.

Referring to FIG. 4, since it is desired that processors PE#0, PE#1, and PE#3 will output a data packet to output port OA when the branch condition terms in the expression (1) match, that is, when the value of the expression (1) is 0, 1 is set in register R4 of each of these processors, and registers R2 and R3 are set similarly to those of FIG. 23. On the other hand, since it is desired that processor PE#2 will send out an output data packet to output port OB independent of the content, 0 is set in register R4, and 0 is set in registers RM and RD. By this setting, processor PE#2 always sends out the output data packet from output port OB independent of the content.

Referring to FIG. 5, the initialization packet stores instruction code C, processor number Pe#, output target specifying parameter A/B, and parameters RA and RD.

Since initialization and data setting of register group 38 using this packet are carried out similarly to the case of register group 28 of FIG. 2 described above, the branch condition on packet output of processor 101 of FIG. 3 can arbitrarily be set and changed.

Figure 6:
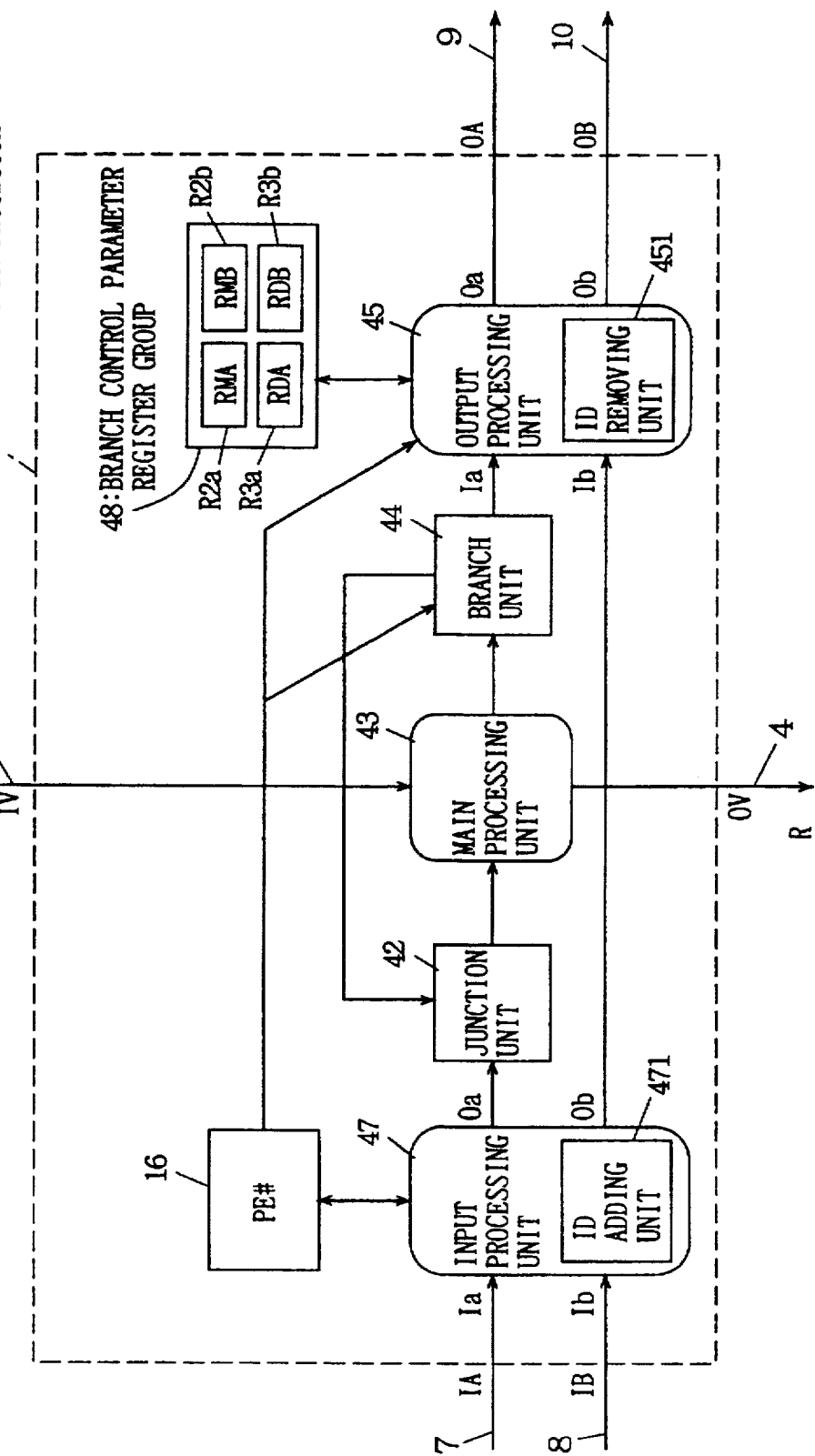
FIG. 6 is a block configuration diagram of a data driven processor according to a third embodiment of the present invention.

Referring to FIG. 6, a data driven processor 102 according to the third embodiment includes an input processing unit 47 including an ID adding unit 471 for adding an input port identifier ID to be described later to an input data packet, and an output processing unit 45 referencing a branch control parameter register group 48. Output processing unit 45 includes an ID removing unit 451 for removing identifier ID added to the data packet. As to the other configurations and the operations, processor 102 of FIG. 6 is similar to the processor of FIG. 1 or FIG. 3 described above. Therefore, the operations of input processing unit 47 and output processing unit 45 will be described here.

Branch control parameter register group 48 includes an RMA storage register R2a for storing a branch comparison mask parameter RMA when a data packet is input from input port IA, an RMB storage register R2b for storing a branch comparison mask parameter RMB when a data packet is input from input port IB, an RDA storage register R3a for storing a branch comparison data parameter RDA when a data packet is input from input port IA, and an RDB storage register R3b for storing a branch comparison data parameter RDB when a data packet is input from input port IB. The parameters RMA and RDA are referenced by output processing unit 45 for determination of the branch condition when a data packet is applied from input port IA, and parameters RMB and RDB are referenced by output processing unit 45 for determination of the branch condition when a data packet is input from input port IB.

Figure 7:
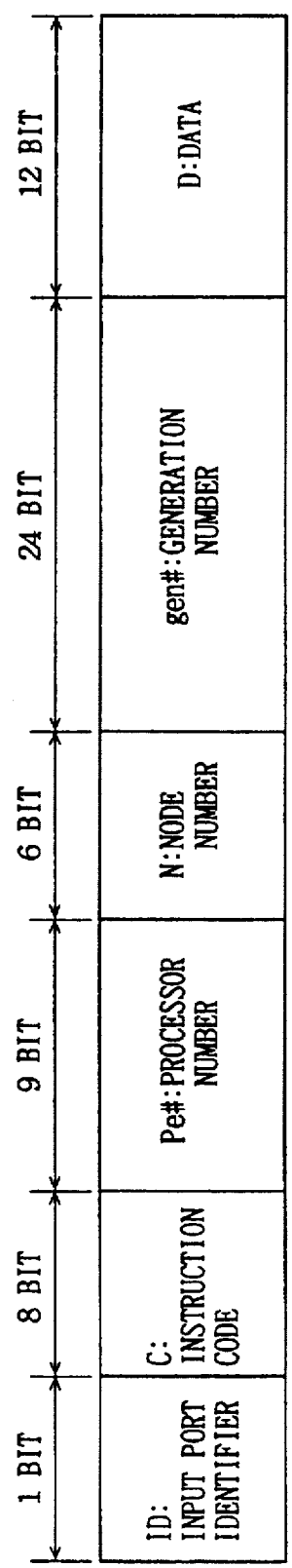
FIG. 7 is a field configuration diagram of a data packet in the data driven processor of FIG. 6.

Referring to FIG. 7, a data packet stores input port identifier ID of one bit in width in addition to the content of the data packet of FIG. 19. Input port identifier ID indicates from which input port the data packet is applied to processor 102. Identifier ID is added to the data packet input to input processing unit 47 by ID adding unit 471. When the input data packet is input from input port IA of the processor, for example, 1 is added to the data packet as input port identifier ID. When the data packet is applied from input port IB, 0 is added to the data packet as input port identifier ID. The data packet to which input port identifier ID is added is output from input processing unit 47. After passing through a junction unit 42, a main processing unit 43, a branch unit 44 and the like, the data packet arrives at output processing unit 45. At this time, junction unit 42, main processing unit 43, and branch unit 44 do not operate the input port identifier ID in the data packet.

As to the data packet which arrives at output processing unit 45, the branch condition is determined while the content of register group 48 is referenced by output processing unit 45. The data packet is provided from any one of output ports OA and OB. At this time, output processing unit 45 references input port identifier ID in the applied data packet, and determines which set of parameters is to be referenced between two sets of parameters RM and RD prepared in register group 48. For example, when input port identifier ID in the data packet is 1, parameters RMA and RDA are referenced, and when input port identifier ID is 0, parameters RMB and RDB are referenced. The branch condition is determined similarly to the conventional case after a set of parameters to be referenced is determined using identifier ID.

In the block configuration diagram shown in FIG. 6, there are two input ports and two output ports. However, the present invention can be applied to a block configuration including three or more input ports and output ports by increasing the bit width of input port identifier ID in a data packet corresponding to the number of input ports and increasing the number of sets of parameters RM and RD prepared in branch control parameter register group 48.

When a data packet is sent out from output processing unit 45, the output data packet is returned to the field configuration shown in FIG. 19 with input port identifier ID removed by ID removing unit 451. Therefore, since identifier ID is added to the packet only when the packet is within the processor, no change is required as to a specification of a transmission path between processors.

Figure 8:
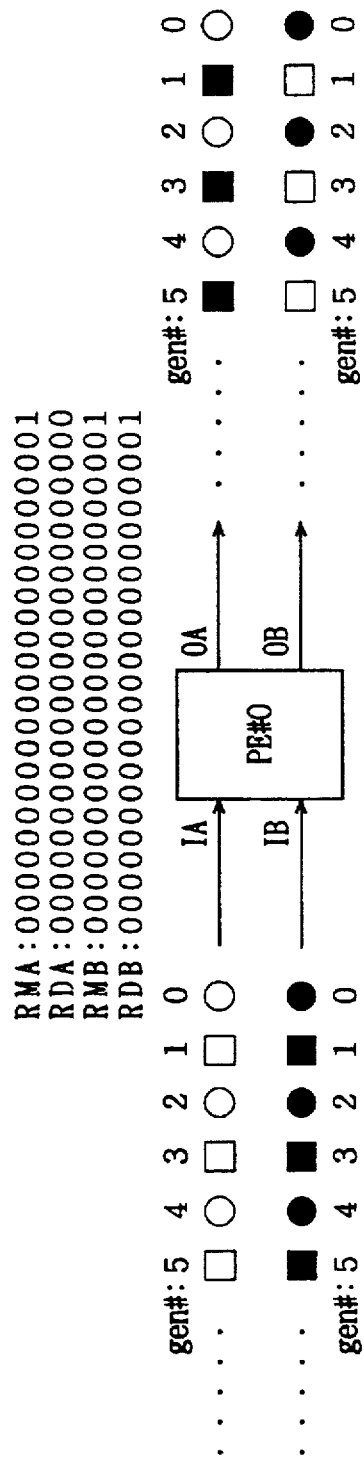
FIG. 8 is a system configuration diagram obtained by re-building a conventional system configuration shown in FIG. 24 using the data driven processor of FIG. 6.
Figure 24:
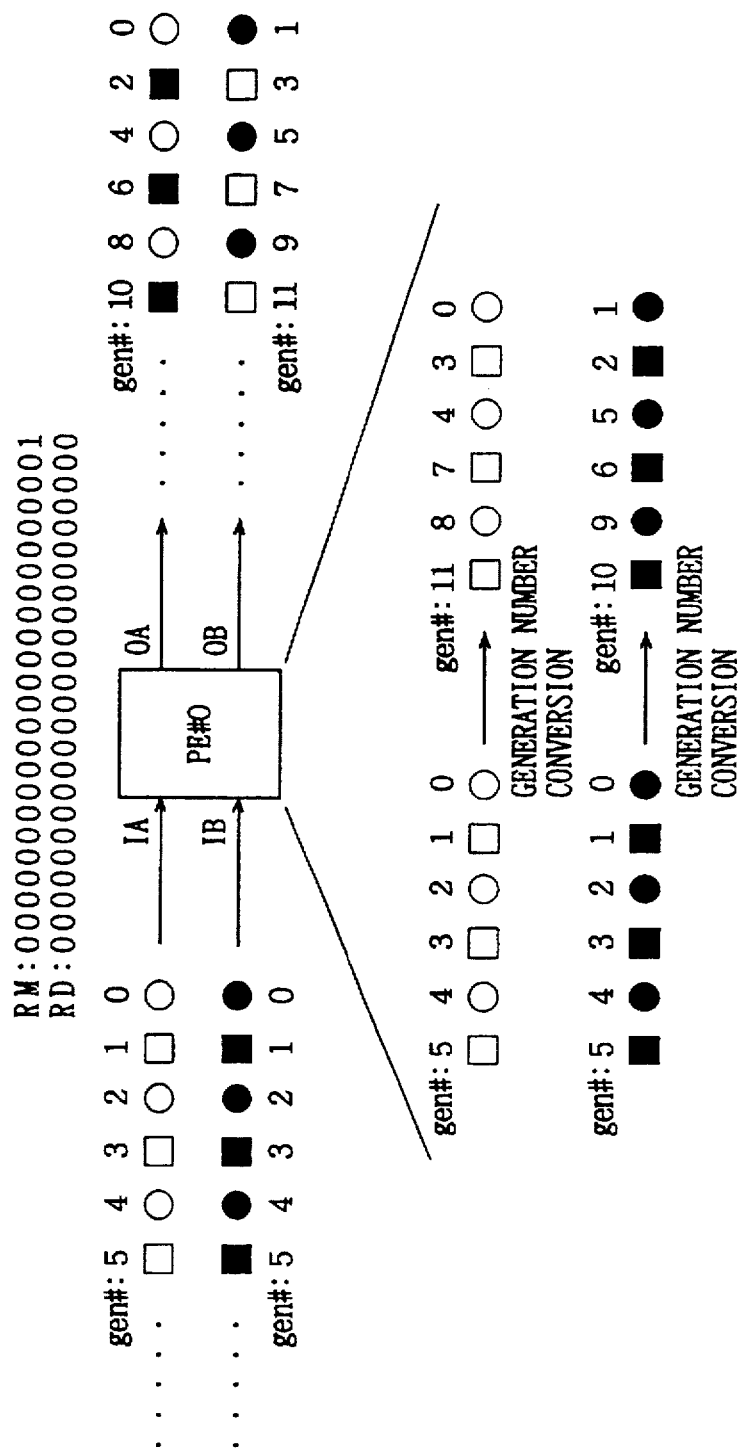
FIG. 24 is a diagram showing a second system configuration for carrying out data classification processing using one conventional video processing data driven processor.
Figure 25A:
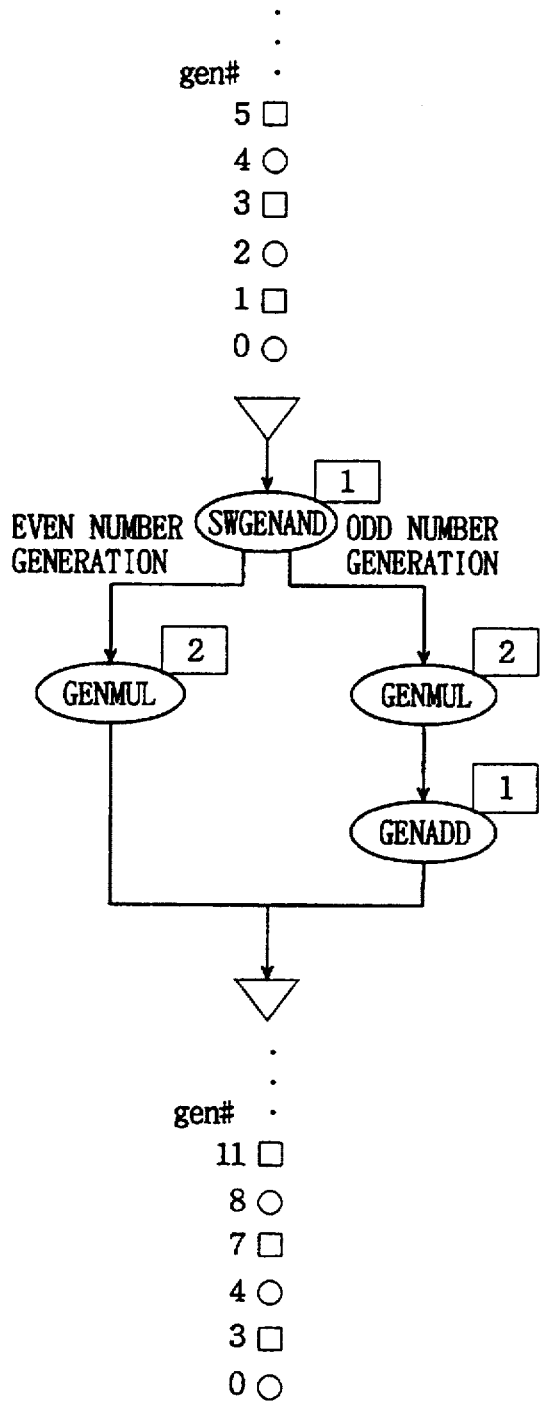
FIGS. 25A and 25B are data flow graphs for carrying out desired data classification processing after conversion of a generation number using the conventional video processing data driven processor in the system shown in FIG. 24.
Figure 25B:
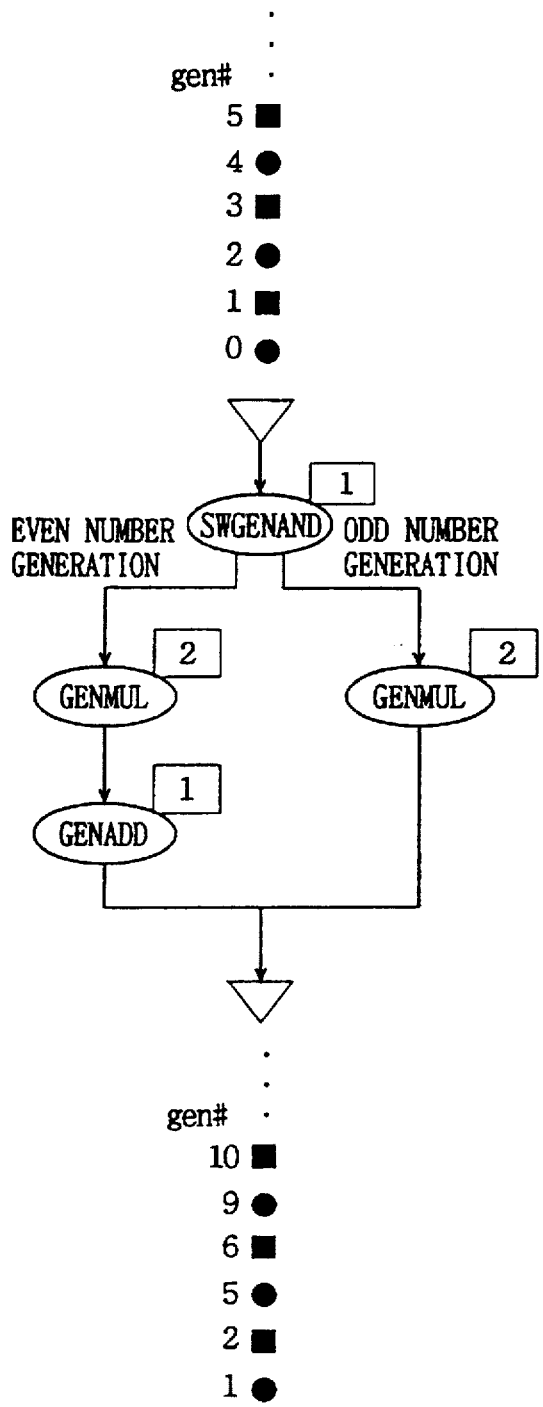

Referring to FIG. 8, for a data packet input from input port IA of processor PE#0, parameters RMA and RDA are set so that one having even generation number gen# should be sent out to output port OA, and that one having odd generation number gen# should be sent out to output port OB. Further, for a data packet applied from input port IB of processor PE#0, parameters RMB and RDB are set so that one having odd generation number gen# should be sent out to output port OA, and that one having even generation number gen# should be sent out to output port OB. In the system of FIG. 8, generation number conversion by program processing in the processor described with reference to FIG. 24 is not required.

Figure 9:
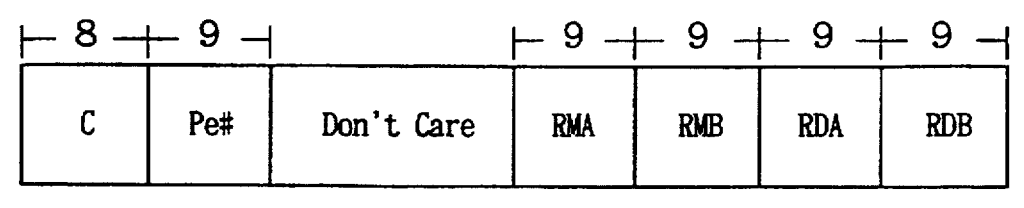

Referring to FIG. 9, the initialization packet stores instruction code C, processor number Pe#, and parameters RMA, RMB, RDA, and RDB. Since data setting including initialization of register group 48 using this packet is carried out similarly to the case of register group 28 of FIG. 1, the branch condition on packet output of processor 102 of FIG. 6 can be set and changed arbitrarily.

Figure 10:
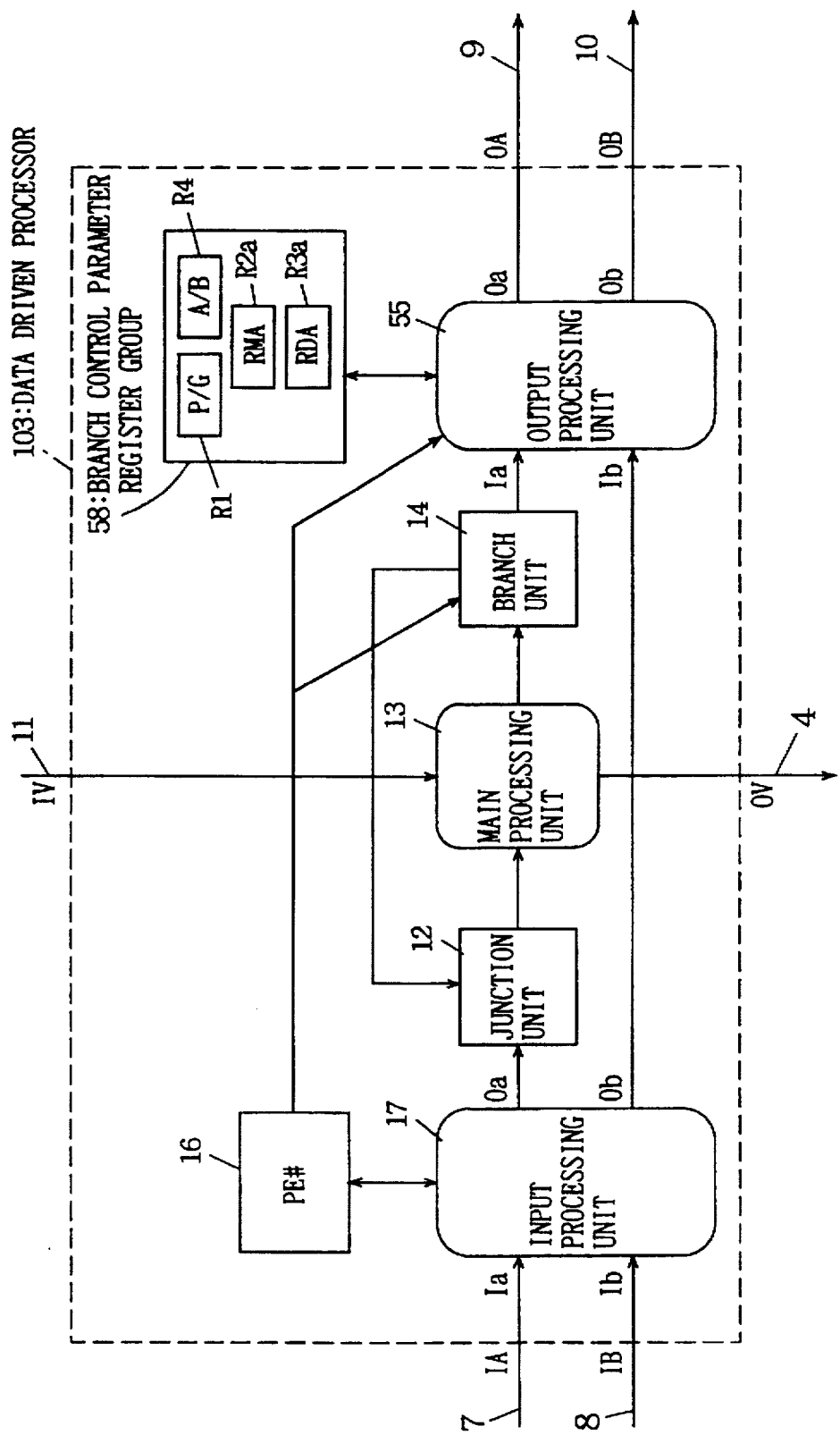
FIG. 10 is a block configuration diagram of a data driven processor according to a fourth embodiment of the present invention.

Referring to FIG. 10, a data driven processor 103 according to the fourth embodiment includes an output processing unit 55 referencing a branch control parameter register group 58 instead of output processing unit 25 referencing branch control parameter register group 28 of processor 100 of FIG. 1. Other than that, the processor of FIG. 10 is similar to that of FIG. 1 in configuration.

Branch control parameter register group 58 includes register R2a storing parameter RMA, register R2b storing parameter RDA, register R1 storing parameter P/G, and register R4 storing parameter A/B.

Processor 103 of FIG. 10 has a feature on output processing of the processors of FIG. 1 and 3. Output processing unit 55 references any one of processor number Pe# and generation number gen# of a data packet according to parameter P/G in register R1, processes the referenced value and parameters RMA and RDA in registers R2a and R3a using any one of the expressions (1) and (2), and sends out the output packet to any one of output ports OA and OB according to the result value and parameter A/B in register R4.

Figure 11:
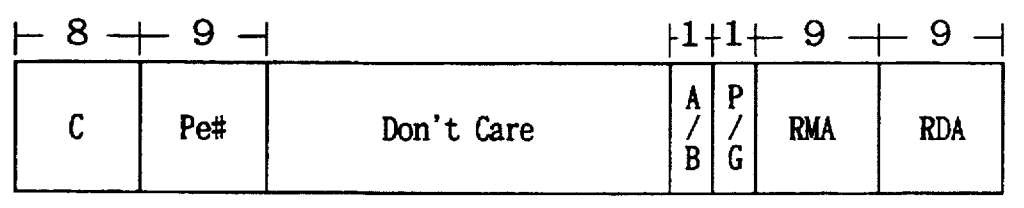

Referring to FIG. 11, the initialization packet stores instruction code C, processor number Pe#, and parameters A/B, P/G, RMA, and RDA. Since data setting including initialization of register group 58 using this packet is carried out similarly to the case of register group 28 of FIG. 1, the branch condition on packet output of processor 103 of FIG. 10 can be set and changed arbitrarily.

Figure 12:
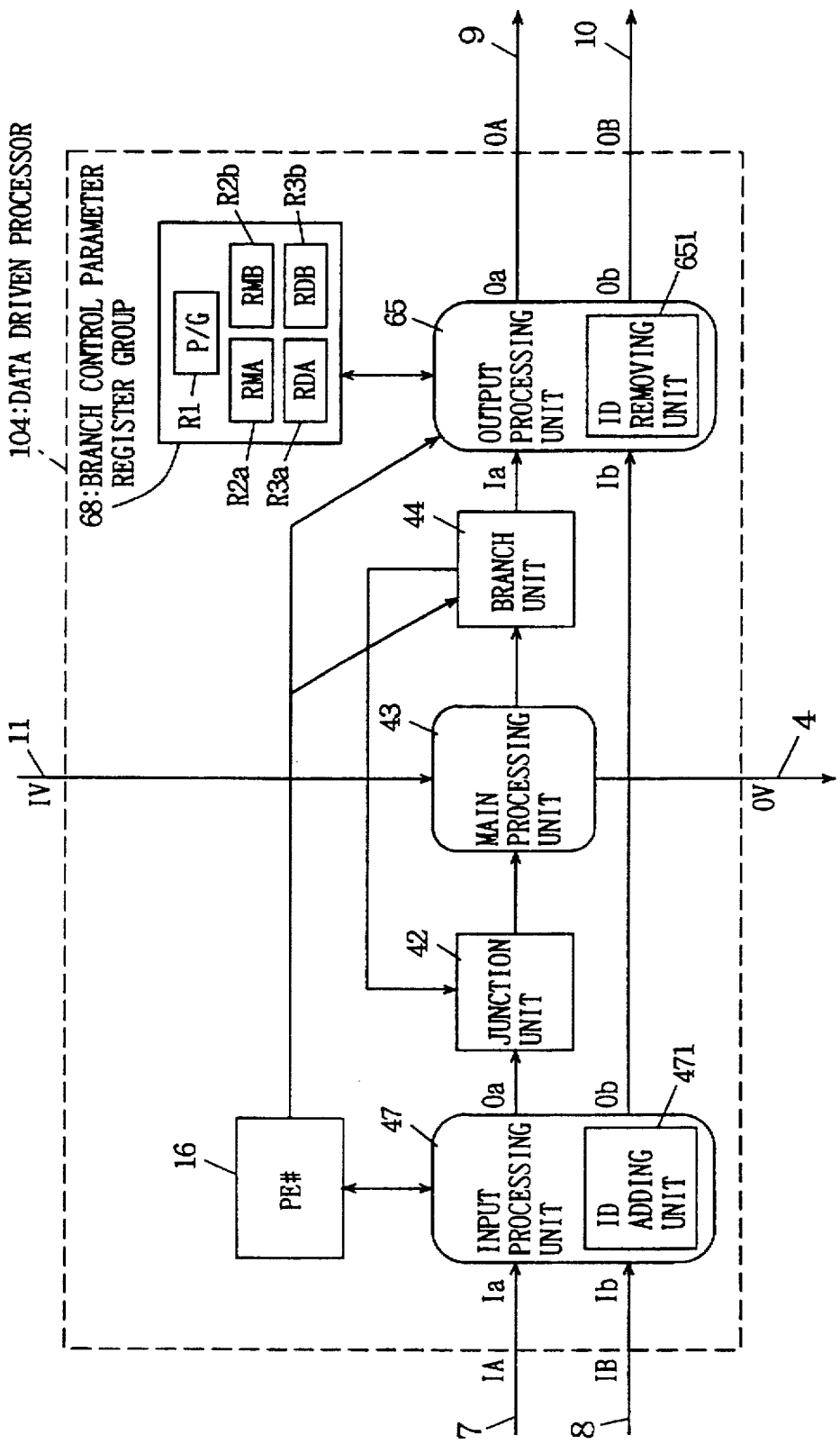
FIG. 12 is a block configuration diagram of a data driven processor according to a fifth embodiment of the present invention.

Referring to FIG. 12, a data driven processor 104 according to the fifth embodiment includes an output processing unit 65 referencing a branch control parameter register group 68 instead of output processing unit 45 referencing branch control parameter register group 48 of processor 102 of FIG. 6. Output processing unit 65 includes an ID removing unit 651 having a similar function to that of ID removing unit 451 of output processing unit 45. The other configurations of the processor of FIG. 12 are the same as those of FIG. 6.

Branch control parameter register group 68 includes register R1 storing parameter P/G in addition to registers R2a, R3a, R2b, and R3b storing parameters RMA, RDA, RMB, and RDB, respectively.

Processor 104 of FIG. 12 has a feature on output processing of processor 100 of FIG. 1 and processor 102 of FIG. 6. Output processing unit 65 references any one of processor number Pe# and generation number gen# of an applied data packet according to parameter P/G in register R1, processes the referenced value and any one of two sets of parameters RM and RD determined by input port identifier ID in the data packet according to any one of the expressions (1) and (2), and sends out the data packet to any one of output ports OA and OB according to the result value. In sending out, identifier ID of the data packet is removed by removing unit 651.

Figure 13:
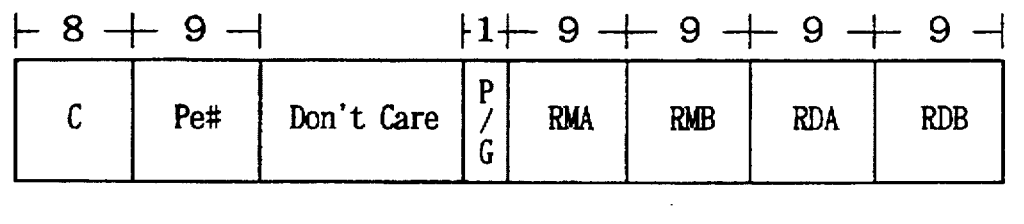

Referring to FIG. 13, the initialization packet stores instruction code C, processor number Pe#, and parameters P/G, RMA, RMB, RDA, and RDB. Since data setting including initialization of register group 68 using this packet is carried out similarly to the case of register group 28 of FIG. 1, the branch condition on packet output of processor 104 of FIG. 12 can be set and changed arbitrarily.

Figure 14:
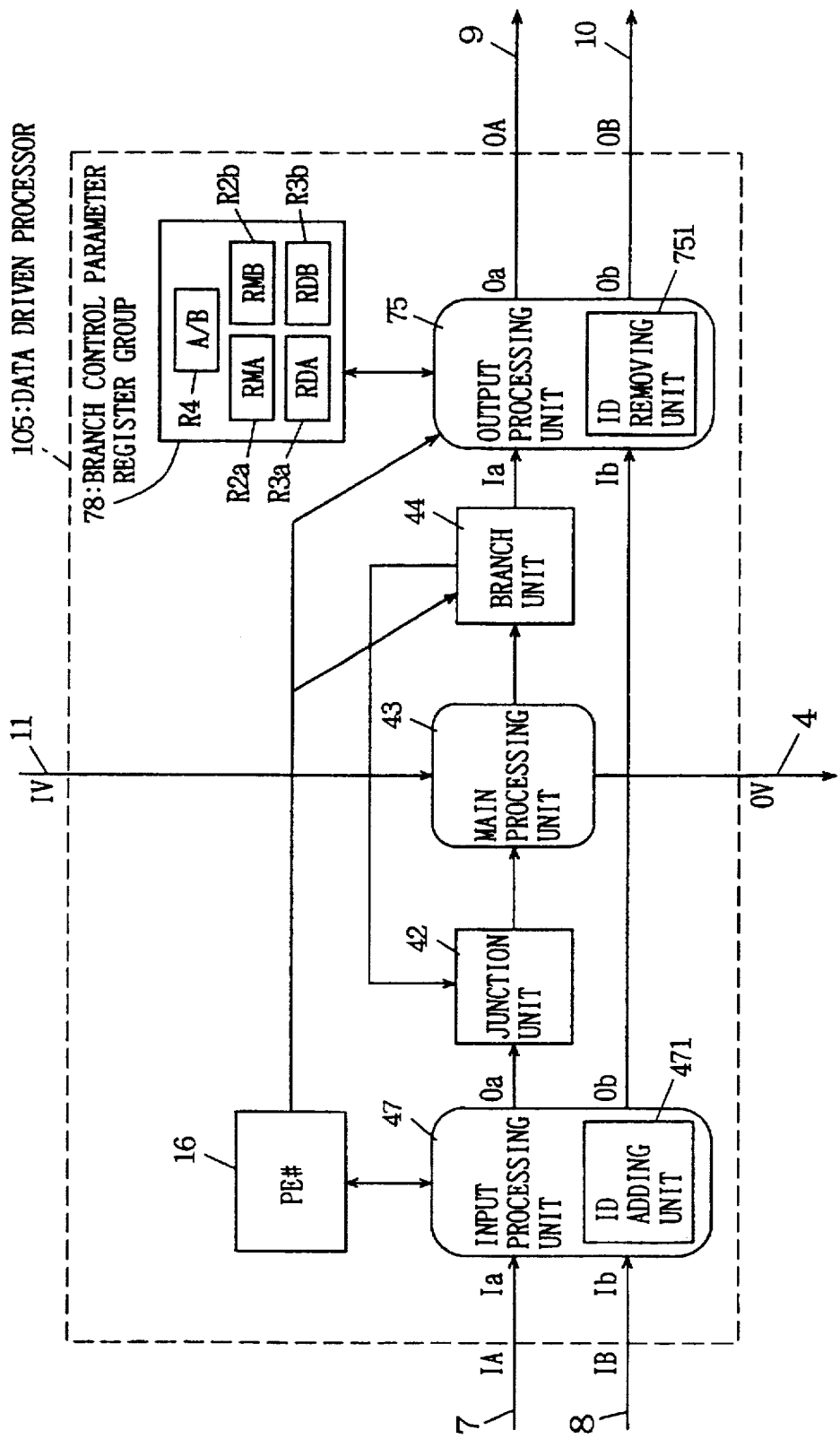
FIG. 14 is a block configuration diagram of a data driven processor according to a sixth embodiment of the present invention.

Referring to FIG. 14, a data driven processor 105 according to the sixth embodiment includes an output processing unit 75 referencing a branch control parameter register group 78 instead of output processing unit 45 referencing branch control parameter register group 48 of processor 102 of FIG. 6. Output processing unit 75 includes an ID removing unit 751 having the same function as that of ID removing unit 451 of output processing unit 45. The other configurations of processor 105 of FIG. 14 are the same as those of FIG. 6. Branch control parameter register group 78 includes registers R4, R2a, R3a, R2b, and R3b storing parameters A/B, RMA, RMB, RDA, and RDB, respectively.

Processor 105 of FIG. 14 has a feature on output processing of the processors of FIGS. 3 and 6. Output processing unit 75 processes processor number Pe# of an applied data packet and any one of two sets of parameters RM and RD determined by input port identifier ID in the data packet according to the expression (1), and sends out the data packet to any one of output ports OA and OB according to the processing result value.

Figure 15:
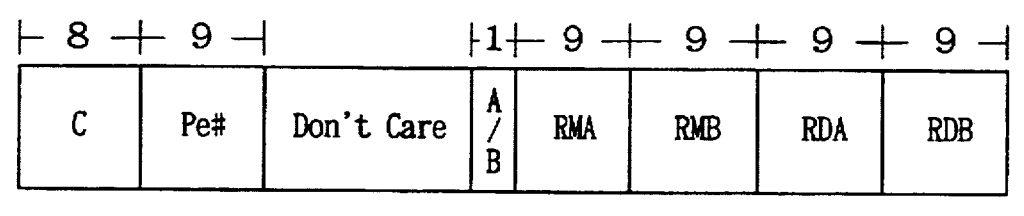

Referring to FIG. 15, the initialization packet stores instruction code C, processor number Pe#, and parameters A/B, RMA, RMB, RDA, and RDB. Since data setting including initialization of register group 78 using this packet is carried out similarly to that of register group 28 of FIG. 1, the branch condition on packet output of processor 105 of FIG. 14 can be set and changed arbitrarily.

Figure 16:
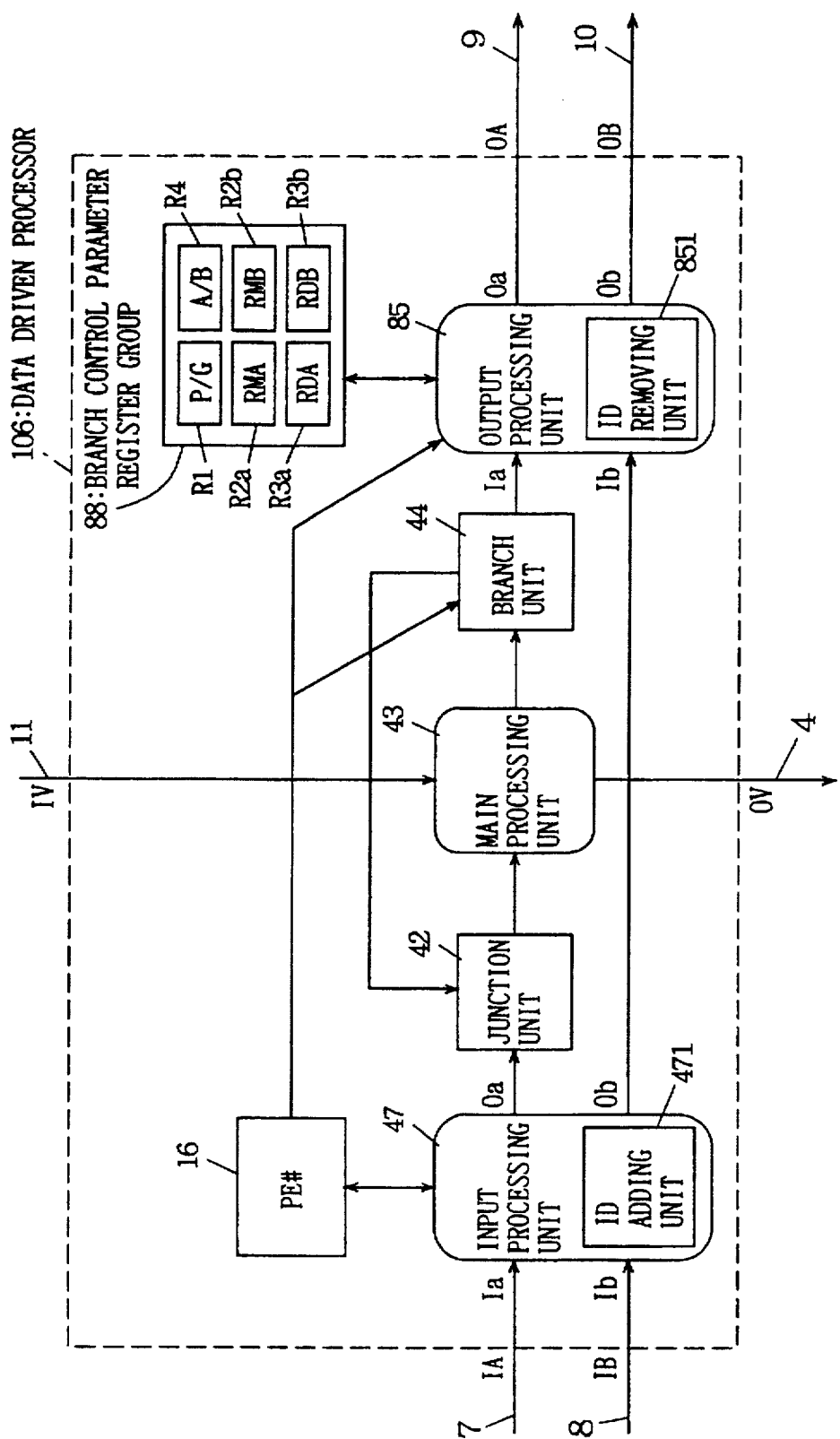
FIG. 16 is a block configuration diagram of a data driven processor according to a seventh embodiment of the present invention.

Referring to FIG. 16, a data driven processor 106 according to the seventh embodiment includes an output processing unit 85 referencing a branch control parameter register group 88 instead of output processing unit 45 referencing branch control parameter register group 48 of processor 102 of FIG. 6. Output processing unit 85 includes an ID removing unit 851 having the same function as that of ID removing unit 451 of output processing unit 45. The other configurations of processor 106 of FIG. 16 are the same as those of FIG. 6. Branch control parameter register group 88 includes registers R1, R4, R2a, R2b, R3a, and R3b respectively storing parameters P/G, A/B, RMA, RMB, RDA, and RDB.

Processor 106 of FIG. 16 has a feature on output processing of the processors of FIGS. 1, 3, and 6. Output processing unit 85 references any one of processor number Pe# and generation number gen# of an applied data packet according to parameter P/G, processes the referenced value and any one of two sets of parameters RM and RD determined by input port identifier ID of the data packet using any one of the expressions (1) and (2), and sends out the data packet to any one of output ports OA and OB according to the processing result value and parameter A/B. In sending out, input port identifier ID of the output packet is removed by ID removing unit 851.

Figures 17, 18:
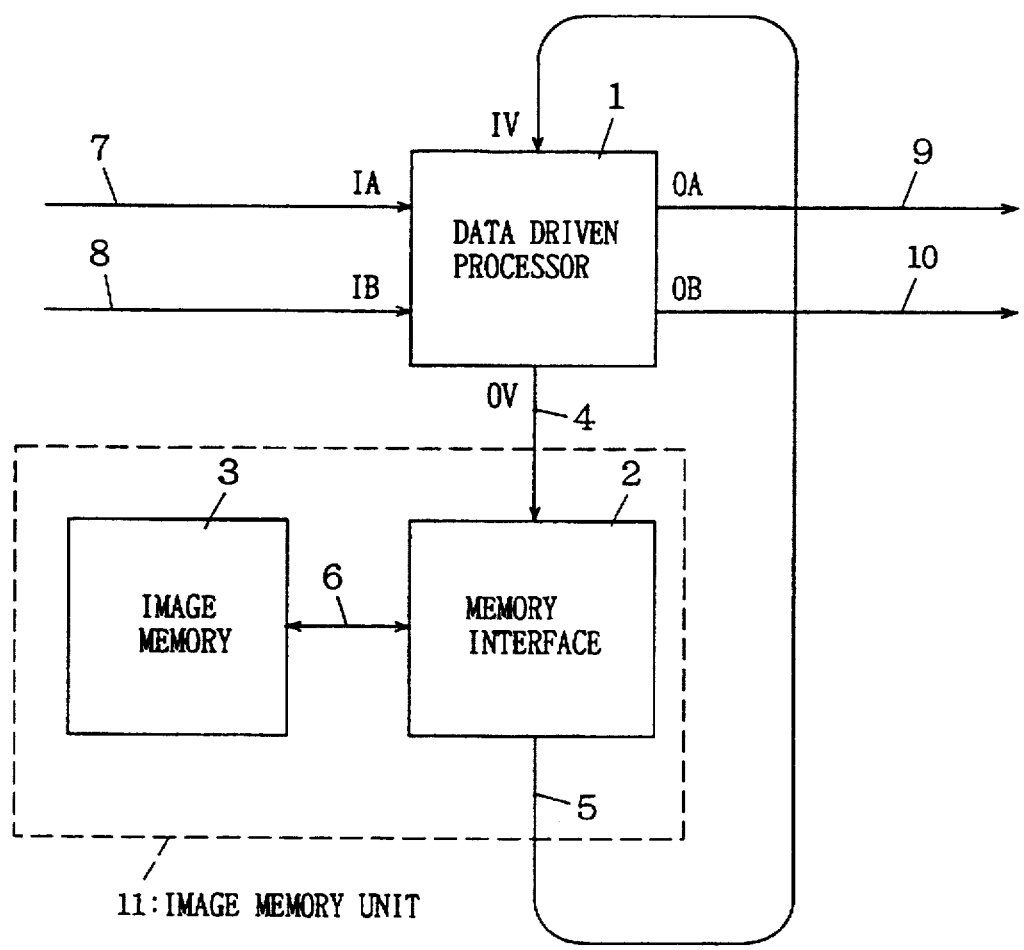
FIG. 17 is a field configuration diagram of an initialization packet applied to a branch control parameter register group 88 of FIG. 16.
FIG. 18 is a block configuration diagram of a conventional data driven information processing system for video signal processing.

Referring to FIG. 17, the initialization packet stores instruction code C, processor number Pe#, and parameters P/G, A/B, RMA, RMB, RDA, and RDB. Since data setting including initialization of register group 88 using this packet is carried out similarly to the case of register group 28 of FIG. 1, the branch condition on packet output of processor 106 of FIG. 16 can be set and changed arbitrarily.

Although registers R2, R3, R2a, R2b, R3a, and R3b of each processor has a 9-bit width in the above embodiments as shown in FIGS. 2, 5, 9, 11, 13, 15, and 17. However, the present invention is not limited thereto. The bit width of each register may be 24 bit, for example. In this case, since a plurality of registers cannot be initialized using one initialization packet, the respective registers may be initialized sequentially using one initialization packet for one register.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data driven information processor, comprising:

a plurality of output ports;

a plurality of input ports each externally supplied with an ordinary data packet including a plurality of information items and a specific data packet including conditional data for selecting an output port corresponding to said ordinary data packet from said plurality of output ports;

input means for inputting one of said ordinary data packet and said specific data packet applied to any of said plurality of input ports for output;

processing means for inputting said ordinary data packet output from said input means and processing said ordinary data packet according to a predetermined procedure for output;

storing means for storing said conditional data of said specific data packet output from said input means; and output means for receiving said ordinary data packet output from said processing means, selecting any of said plurality of output ports based on said plurality of information items in the received ordinary data packet and said conditional data in said storing means, and sending out externally the received ordinary data packet through the selected output port;

wherein said conditional data includes an information specifying parameter for specifying a type of the plurality of information items as an information type to be used for said selection out of said plurality of information items in said ordinary data packet.

2. The data driven information processor according to claim 1, wherein said selection carries out an operation corresponding to the information type specified by said information specifying parameter.

3. The data driven information processor according to claim 2, wherein
said conditional data further includes
an operation parameter group formed of a plurality of operation parameters used for said operation, and
an output port specifying parameter for specifying one of the plurality of output ports according to a result of said operation.

4. The data driven information processor according to claim 2, wherein
said input means includes
input port information adding means for adding to said ordinary data packet applied to any of said plurality of input ports, as input port information indicating an input port to which the ordinary data packet is applied out of said plurality of input ports,
said conditional data further includes
a plurality of operation parameter groups each formed of a plurality of operation parameters for said operation, and
said input port information specifies a group used for said operation out of said plurality of operation parameter groups.

5. The data driven information processor according to claim 4, wherein
said conditional data further includes
an output port specifying parameter for specifying an output port according to a result of said operation out of said plurality of output ports.

6. The data driven information processor according to claim 4, wherein
said output means includes
means for removing, before sending out said ordinary data packet externally after completion of said selection, said input port information added to the ordinary data packet.

7. The data driven information processor according to claim 5, wherein
said output means includes
means for removing, before sending out said ordinary data packet externally after completion of said selection, said input port information added to the ordinary data packet.

8. The data driven information processor according to claim 1, wherein
said conditional data in said storing means is updated whenever said specific data packet is input by said input means.

9. The data driven information processor according to claim 2, wherein
said conditional data in said storing means is updated whenever said specific data packet is input by said input means.

10. The data driven information processor according to claim 3, wherein
said conditional data in said storing means is updated whenever said specific data packet is input by said input means.

11. The data driven information processor according to claim 4, wherein
said conditional data in said storing means is updated whenever said specific data packet is input by said input means.

12. The data driven information processor according to claim 5, wherein
said conditional data in said storing means is updated whenever said specific data packet is input by said input means.

13. The data driven information processor according to claim 6, wherein
said conditional data in said storing means is updated whenever said specific data packet is input by said input means.

14. The data driven information processor according to claim 7, wherein
said conditional data in said storing means is updated whenever said specific data packet is input by said input means.

15. The data driven information processor according to claim 1, wherein
said information specifying parameter includes
a position specifying parameter for specifying an information item to be used for said selection out of said plurality of information items in said ordinary data packet by a position at which the information item is stored in the ordinary data packet.

16. The data driven information processor according to claim 15, wherein
said plurality of information items included in said ordinary data packet include a generation information and a processor specifying information specified by said position specifying parameter,
said generation information being applied, when a plurality of said ordinary data packets are input to said data driven information processor in a time series order, to each of said plurality of ordinary data packets in accordance with said time series order, and
said data driven information processor specifies, when each of a plurality of said data driven information processors connects each of said plurality of input ports to any of said plurality of output ports of another said data driven information processor to configure a system, said data driven information processor which should input said ordinary data packet and process the ordinary data packet by said processing means in the system.

17. The data driven information processor according to claim 2, wherein
said information specifying parameter includes
a position specifying parameter for specifying an information item to be used for said selection out of said plurality of information items in said ordinary data packet by a position at which the information item is stored in the ordinary data packet.

18. The data driven information processor according to claim 17, wherein
said plurality of information items included in said ordinary data packet include a generation information and a processor specifying information specified by said position specifying parameter,
said generation information being applied, when a plurality of said ordinary data packets are input to said data driven information processor in a time series order, to each of said plurality of ordinary data packets in accordance with said time series order, and
said data driven information processor specifies, when each of a plurality of said data driven information processors connects each of said plurality of input ports to any of said plurality of output ports of another said data driven information processor to configure a system, said data driven information processor which should input said ordinary data packet and process the ordinary data packet by said processing means in the system.

19. The data driven information processor according to claim 3, wherein said information specifying parameter includes a position specifying parameter for specifying an information item to be used for said selection out of said plurality of information items in said ordinary data packet by a position at which the information item is stored in the ordinary data packet.

20. The data driven information processor according to claim 19, wherein said plurality of information items included in said ordinary data packet include a generation information and a processor specifying information specified by said position specifying parameter, said generation information being applied, when a plurality of said ordinary data packets are input to said data driven information processor in a time series order, to each of said plurality of ordinary data packets in accordance with said time series order, and said data driven information processor specifies, when each of a plurality of said data driven information processors connects each of said plurality of input ports to any of said plurality of output ports of another said data driven information processor to configure a system, said data driven information processor which should input said ordinary data packet and process the ordinary data packet by said processing means in the system.

21. The data driven information processor according to claim 4, wherein said information specifying parameter includes a position specifying parameter for specifying an information item to be used for said selection out of said plurality of information items in said ordinary data packet by a position at which the information item is stored in the ordinary data packet.

22. The data driven information processor according to claim 21, wherein said plurality of information items included in said ordinary data packet include a generation information and a processor specifying information specified by said position specifying parameter, said generation information being applied, when a plurality of said ordinary data packets are input to said data driven information processor in a time series order, to each of said plurality of ordinary data packets in accordance with said time series order, and said data driven information processor specifies, when each of a plurality of said data driven information processors connects each of said plurality of input ports to any of said plurality of output ports of another said data driven information processor to configure a system, said data driven information processor which should input said ordinary data packet and process the ordinary data packet by said processing means in the system.

23. The data driven information processor according to claim 5, wherein said information specifying parameter includes a position specifying parameter for specifying an information item to be used for said selection out of said plurality of information items in said ordinary data packet by a position at which the information item is stored in the ordinary data packet.

24. The data driven information processor according to claim 23, wherein said plurality of information items included in said ordinary data packet include a generation information and a processor specifying information specified by said position specifying parameter, said generation information being applied, when a plurality of said ordinary data packets are input to said data driven information processor in a time series order, to each of said plurality of ordinary data packets in accordance with said time series order, and said data driven information processor specifies, when each of a plurality of said data driven information processors connects each of said plurality of input ports to any of said plurality of output ports of another said data driven information processor to configure a system, said data driven information processor which should input said ordinary data packet and process the ordinary data packet by said processing means in the system.

25. The data driven information processor according to claim 6, wherein said information specifying parameter includes a position specifying parameter for specifying an information item to be used for said selection out of said plurality of information items in said ordinary data packet by a position at which the information item is stored in the ordinary data packet.

26. The data driven information processor according to claim 25, wherein said plurality of information items included in said ordinary data packet include a generation information and a processor specifying information specified by said position specifying parameter, said generation information being applied, when a plurality of said ordinary data packets are input to said data driven information processor in a time series order, to each of said plurality of ordinary data packets in accordance with said time series order, and said data driven information processor specifies, when each of a plurality of said data driven information processors connects each of said plurality of input ports to any of said plurality of output ports of another said data driven information processor to configure a system, said data driven information processor which should input said ordinary data packet and process the ordinary data packet by said processing means in the system.

27. The data driven information processor according to claim 7, wherein said information specifying parameter includes a position specifying parameter for specifying an information item to be used for said selection out of said plurality of information items in said ordinary data packet by a position at which the information item is stored in the ordinary data packet.

28. The data driven information processor according to claim 27, wherein said plurality of information items included in said ordinary data packet include a generation information and

19 a processor specifying information specified by said position specifying parameter, said generation information being applied, when a plurality of said ordinary data packets are input to said data driven information processor in a time series order, to each of said plurality of ordinary data packets in accordance with said time series order, and said data driven information processor specifies, when each of a plurality of said data driven information processors connects each of said plurality of input ports to any of said plurality of output ports of another said data driven information processor to configure a system, said data driven information processor which should input said ordinary data packet and process the ordinary data packet by said processing means in the system.

29. The data driven information processor according to claim 8, wherein said information specifying parameter includes a position specifying parameter for specifying an information item to be used for said selection out of said plurality of information items in said ordinary data packet by a position at which the information item is stored in the ordinary data packet.

30. The data driven information processor according to claim 29, wherein said plurality of information items included in said ordinary data packet include a generation information and a processor specifying information specified by said position specifying parameter, said generation information being applied, when a plurality of said ordinary data packets are input to said data driven information processor in a time series order, to each of said plurality of ordinary data packets in accordance with said time series order, and said data driven information processor specifies, when each of a plurality of said data driven information processors connects each of said plurality of input ports to any of said plurality of output ports of another said data driven information processor to configure a system, said data driven information processor which should input said ordinary data packet and process the ordinary data packet by said processing means in the system.

31. The data driven information processor according to claim 9, wherein said information specifying parameter includes a position specifying parameter for specifying an information item to be used for said selection out of said plurality of information items in said ordinary data packet by a position at which the information item is stored in the ordinary data packet.

32. The data driven information processor according to claim 31, wherein said plurality of information items included in said ordinary data packet include a generation information and a processor specifying information specified by said position specifying parameter, said generation information being applied, when a plurality of said ordinary data packets are input to said data driven information processor in a time series order, to each of said plurality of ordinary data packets in accordance with said time series order, and said data driven information processor specifies, when each of a plurality of said data driven information

20 processors connects each of said plurality of input ports to any of said plurality of output ports of another said data driven information processor to configure a system, said data driven information processor which should input said ordinary data packet and process the ordinary data packet by said processing means in the system.

33. The data driven information processor according to claim 10, wherein said information specifying parameter includes a position specifying parameter for specifying an information item to be used for said selection out of said plurality of information items in said ordinary data packet by a position at which the information item is stored in the ordinary data packet.

34. The data driven information processor according to claim 33, wherein said plurality of information items included in said ordinary data packet include a generation information and a processor specifying information specified by said position specifying parameter, said generation information being applied, when a plurality of said ordinary data packets are input to said data driven information processor in a time series order, to each of said plurality of ordinary data packets in accordance with said time series order, and said data driven information processor specifies, when each of a plurality of said data driven information processors connects each of said plurality of input ports to any of said plurality of output ports of another said data driven information processor to configure a system, said data driven information processor which should input said ordinary data packet and process the ordinary data packet by said processing means in the system.

35. The data driven information processor according to claim 11, wherein said information specifying parameter includes a position specifying parameter for specifying an information item to be used for said selection out of said plurality of information items in said ordinary data packet by a position at which the information item is stored in the ordinary data packet.

36. The data driven information processor according to claim 35, wherein said plurality of information items included in said ordinary data packet include a generation information and a processor specifying information specified by said position specifying parameter, said generation information being applied, when a plurality of said ordinary data packets are input to said data driven information processor in a time series order, to each of said plurality of ordinary data packets in accordance with said time series order, and said data driven information processor specifies, when each of a plurality of said data driven information processors connects each of said plurality of input ports to any of said plurality of output ports of another said data driven information processor to configure a system, said data driven information processor which should input said ordinary data packet and process the ordinary data packet by said processing means in the system.

37. The data driven information processor according to claim 12, wherein said information specifying parameter includes a position specifying parameter for specifying an information item to be used for said selection out of said plurality of information items in said ordinary data packet by a position at which the information item is stored in the ordinary data packet.

38. The data driven information processor according to claim 37, wherein said plurality of information items included in said ordinary data packet include a generation information and a processor specifying information specified by said position specifying parameter, said generation information being applied, when a plurality of said ordinary data packets are input to said data driven information processor in a time series order, to each of said plurality of ordinary data packets in accordance with said time series order, and said data driven information processor specifies, when each of a plurality of said data driven information processors connects each of said plurality of input ports to any of said plurality of output ports of another said data driven information processor to configure a system, said data driven information processor which should input said ordinary data packet and process the ordinary data packet by said processing means in the system.

39. The data driven information processor according to claim 13, wherein said information specifying parameter includes a position specifying parameter for specifying an information item to be used for said selection out of said plurality of information items in said ordinary data packet by a position at which the information item is stored in the ordinary data packet.

40. The data driven information processor according to claim 39, wherein said plurality of information items included in said ordinary data packet include a generation information and a processor specifying information specified by said position specifying parameter, said generation information being applied, when a plurality of said ordinary data packets are input to said data driven information processor in a time series order, to each of said plurality of ordinary data packets in accordance with said time series order, and said data driven information processor specifies, when each of a plurality of said data driven information processors connects each of said plurality of input ports to any of said plurality of output ports of another said data driven information processor to configure a system, said data driven information processor which should input said ordinary data packet and process the ordinary data packet by said processing means in the system.

41. The data driven information processor according to claim 14, wherein said information specifying parameter includes a position specifying parameter for specifying an information item to be used for said selection out of said plurality of information items in said ordinary data packet by a position at which the information item is stored in the ordinary data packet.

42. The data driven information processor according to claim 41, wherein said plurality of information items included in said ordinary data packet include a generation information and a processor specifying information specified by said position specifying parameter, said generation information being applied, when a plurality of said ordinary data packets are input to said data driven information processor in a time series order, to each of said plurality of ordinary data packets in accordance with said time series order, and said data driven information processor specifies, when each of a plurality of said data driven information processors connects each of said plurality of input ports to any of said plurality of output ports of another said data driven information processor to configure a system, said data driven information processor which should input said ordinary data packet and process the ordinary data packet by said processing means in the system.

43. The data driven information processor according to claim 1, wherein said plurality of information items included in said ordinary data packet include a generation information and a processor specifying information specified by said position specifying parameter, said generation information being applied, when a plurality of said ordinary data packets are input to said data driven information processor in a time series order, to each of said plurality of ordinary data packets in accordance with said time series order, and said data driven information processor specifies, when each of a plurality of said data driven information processors connects each of said plurality of input ports to any of said plurality of output ports of another said data driven information processor to configure a system, said data driven information processor which should input said ordinary data packet and process the ordinary data packet by said processing means in the system.

44. The data driven information processor according to claim 2, wherein said plurality of information items included in said ordinary data packet include a generation information and a processor specifying information specified by said position specifying parameter, said generation information being applied, when a plurality of said ordinary data packets are input to said data driven information processor in a time series order, to each of said plurality of ordinary data packets in accordance with said time series order, and said data driven information processor specifies, when each of a plurality of said data driven information processors connects each of said plurality of input ports to any of said plurality of output ports of another said data driven information processor to configure a system, said data driven information processor which should input said ordinary data packet and process the ordinary data packet by said processing means in the system.

45. The data driven information processor according to claim 3, wherein said plurality of information items included in said ordinary data packet include a generation information and a processor specifying information specified by said position specifying parameter, said generation information being applied, when a plurality of said ordinary data packets are input to said data driven information processor in a time series order, to each of said plurality of ordinary data packets in accordance with said time series order, and said data driven information processor specifies, when each of a plurality of said data driven information processors connects each of said plurality of input ports to any of said plurality of output ports of another said data driven information processor to configure a system, said data driven information processor which should input said ordinary data packet and process the ordinary data packet by said processing means in the system.

46. The data driven information processor according to claim 4, wherein said plurality of information items included in said ordinary data packet include a generation information and a processor specifying information specified by said position specifying parameter, said generation information being applied, when a plurality of said ordinary data packets are input to said data driven information processor in a time series order, to each of said plurality of ordinary data packets in accordance with said time series order, and said data driven information processor specifies, when each of a plurality of said data driven information processors connects each of said plurality of input ports to any of said plurality of output ports of another said data driven information processor to configure a system, said data driven information processor which should input said ordinary data packet and process the ordinary data packet by said processing means in the system.

47. The data driven information processor according to claim 5, wherein said plurality of information items included in said ordinary data packet include a generation information and a processor specifying information specified by said position specifying parameter, said generation information being applied, when a plurality of said ordinary data packets are input to said data driven information processor in a time series order, to each of said plurality of ordinary data packets in accordance with said time series order, and said data driven information processor specifies, when each of a plurality of said data driven information processors connects each of said plurality of input ports to any of said plurality of output ports of another said data driven information processor to configure a system, said data driven information processor which should input said ordinary data packet and process the ordinary data packet by said processing means in the system.

48. The data driven information processor according to claim 6, wherein said plurality of information items included in said ordinary data packet include a generation information and a processor specifying information specified by said position specifying parameter, said generation information being applied, when a plurality of said ordinary data packets are input to said data driven information processor in a time series order, to each of said plurality of ordinary data packets in accordance with said time series order, and said data driven information processor specifies, when each of a plurality of said data driven information processors connects each of said plurality of input ports to any of said plurality of output ports of another said data driven information processor to configure a system, said data driven information processor which should input said ordinary data packet and process the ordinary data packet by said processing means in the system.

49. The data driven information processor according to claim 7, wherein said plurality of information items included in said ordinary data packet include a generation information and a processor specifying information specified by said position specifying parameter, said generation information being applied, when a plurality of said ordinary data packets are input to said data driven information processor in a time series order, to each of said plurality of ordinary data packets in accordance with said time series order, and said data driven information processor specifies, when each of a plurality of said data driven information processors connects each of said plurality of input ports to any of said plurality of output ports of another said data driven information processor to configure a system, said data driven information processor which should input said ordinary data packet and process the ordinary data packet by said processing means in the system.

50. The data driven information processor according to claim 8, wherein said plurality of information items included in said ordinary data packet include a generation information and a processor specifying information specified by said position specifying parameter, said generation information being applied, when a plurality of said ordinary data packets are input to said data driven information processor in a time series order, to each of said plurality of ordinary data packets in accordance with said time series order, and said data driven information processor specifies, when each of a plurality of said data driven information processors connects each of said plurality of input ports to any of said plurality of output ports of another said data driven information processor to configure a system, said data driven information processor which should input said ordinary data packet and process the ordinary data packet by said processing means in the system.

51. The data driven information processor according to claim 9, wherein said plurality of information items included in said ordinary data packet include a generation information and a processor specifying information specified by said position specifying parameter, said generation information being applied, when a plurality of said ordinary data packets are input to said data driven information processor in a time series order, to each of said plurality of ordinary data packets in accordance with said time series order, and said data driven information processor specifies, when each of a plurality of said data driven information processors connects each of said plurality of input ports to any of said plurality of output ports of another said data driven information processor to configure a system, said data driven information processor which should input said ordinary data packet and process the ordinary data packet by said processing means in the system.

52. The data driven information processor according to claim 10, wherein said plurality of information items included in said ordinary data packet include a generation information and a processor specifying information specified by said position specifying parameter, said generation information being applied, when a plurality of said ordinary data packets are input to said data driven information processor in a time series order, to each of said plurality of ordinary data packets in accordance with said time series order, and said data driven information processor specifies, when each of a plurality of said data driven information processors connects each of said plurality of input ports to any of said plurality of output ports of another said data driven information processor to configure a system, said data driven information processor which should input said ordinary data packet and process the ordinary data packet by said processing means in the system.

53. The data driven information processor according to claim 11, wherein said plurality of information items included in said ordinary data packet include a generation information and a processor specifying information specified by said position specifying parameter, said generation information being applied, when a plurality of said ordinary data packets are input to said data driven information processor in a time series order, to each of said plurality of ordinary data packets in accordance with said time series order, and said data driven information processor specifies, when each of a plurality of said data driven information processors connects each of said plurality of input ports to any of said plurality of output ports of another said data driven information processor to configure a system, said data driven information processor which should input said ordinary data packet and process the ordinary data packet by said processing means in the system.

54. The data driven information processor according to claim 12, wherein said plurality of information items included in said ordinary data packet include a generation information and a processor specifying information specified by said position specifying parameter, said generation information being applied, when a plurality of said ordinary data packets are input to said data driven information processor in a time series order, to each of said plurality of ordinary data packets in accordance with said time series order, and said data driven information processor specifies, when each of a plurality of said data driven information processors connects each of said plurality of input ports to any of said plurality of output ports of another said data driven information processor to configure a system, said data driven information processor which should input said ordinary data packet and process the ordinary data packet by said processing means in the system.

55. The data driven information processor according to claim 13, wherein said plurality of information items included in said ordinary data packet include a generation information and a processor specifying information specified by said position specifying parameter, said generation information being applied, when a plurality of said ordinary data packets are input to said data driven information processor in a time series order, to each of said plurality of ordinary data packets in accordance with said time series order, and said data driven information processor specifies, when each of a plurality of said data driven information processors connects each of said plurality of input ports to any of said plurality of output ports of another said data driven information processor to configure a system, said data driven information processor which should input said ordinary data packet and process the ordinary data packet by said processing means in the system.

56. The data driven information processor according to claim 14, wherein said plurality of information items included in said ordinary data packet include a generation information and a processor specifying information specified by said position specifying parameter, said generation information being applied, when a plurality of said ordinary data packets are input to said data driven information processor in a time series order, to each of said plurality of ordinary data packets in accordance with said time series order, and said data driven information processor specifies, when each of a plurality of said data driven information processors connects each of said plurality of input ports to any of said plurality of output ports of another said data driven information processor to configure a system, said data driven information processor which should input said ordinary data packet and process the ordinary data packet by said processing means in the system.

57. A data driven information processor, comprising:

a plurality of output ports;

a plurality of input ports each externally supplied with an ordinary data packet including a plurality of information items and a specific data packet including conditional data for selecting an output port corresponding to said ordinary data packet from said plurality of output ports;

input means for inputting one of said ordinary data packet and said specific data packet applied to any of said plurality of input ports for output;

processing means for inputting said ordinary data packet output from said input means and processing said ordinary data packet according to a predetermined procedure for output;

storing means for storing said conditional data of said specific data packet output from said input means; and output means for receiving said ordinary data packet output from said processing means, selecting any of said plurality of output ports based on a predetermined information item of said plurality of information items in the received ordinary data packet and said conditional data in said storing means, and sending out externally the received ordinary data packet through the selected output port;

wherein said selection includes an operation, and said conditional data includes a plurality of input port source specific operation parameters used for said operation and an output port specifying parameter for specifying an output port according to a result of said operation out of said plurality of output ports.

58. The data driven information processor according to claim 57, wherein said conditional data in said storing means is updated whenever said specific data packet is input by said input means.

59. The data driven information processor according to claim 57, wherein said input means includes input port information adding means for adding to said ordinary data packet applied to any of said plurality of input ports, an input port information indicating an input port to which the ordinary data packet is applied out of said plurality of input ports, said conditional data further includes a plurality of operation parameter groups each formed of a plurality of operation parameters for said operation, and said input port information specifies a group used for said operation out of said plurality of operation parameter groups.

60. The data driven information processor according to claim 59, wherein said conditional data in said storing means is updated whenever said specific data packet is input by said input means.

61. The data driven information processor according to claim 59, wherein said output means includes means for removing, before sending out said ordinary data packet externally after completion of said selection, said input port information added to the ordinary data packet.

62. The data driven information processor according to claim 61, wherein said conditional data in said storing means is updated whenever said specific data packet is input by said input means.

63. A data driven information processor, comprising:

a plurality of output ports;

a plurality of input ports each externally supplied with an ordinary data packet including a plurality of information items and a specific data packet including conditional data for selecting an output port corresponding to said ordinary data packet from said plurality of output ports;

input means for inputting one of said ordinary data packet and said specific data packet applied to any of said plurality of input ports for output;

processing means for inputting said ordinary data packet output from said input means and processing said ordinary data packet according to a predetermined procedure for output;

storing means for storing said conditional data of said specific data packet output from said input means; and output means for receiving said ordinary data packet output from said processing means, selecting any of said plurality of output ports based on a result of an operation by a predetermined information item out of said plurality of information items in the ordinary data packet and said conditional data in said storing means, and sending out externally the ordinary data packet through the selected output port;

said input means includes input port information adding means for adding to said ordinary data packet applied to any of said plurality of input ports, an input port information indicating an input port to which the ordinary data packet is applied out of said plurality of input ports, said conditional data further includes a plurality of operation parameter groups each formed of a plurality of operation parameters for said operation, and said input port information specifies a group used for said operation out of said plurality of operation parameter groups.

64. The data driven information processor according to claim 63, wherein said conditional data in said storing means is updated whenever said specific data packet is input by said input means.

65. The data driven information processor according to claim 63, wherein said output means includes means for removing, before sending out said ordinary data packet externally after completion of said selection, said input port information added to the ordinary data packet.

66. The data driven information processor according to claim 65, wherein said conditional data in said storing means is updated whenever said specific data packet is input by said input means.

* * * * *